United States Patent
Petladwala et al.

(10) Patent No.: US 12,236,777 B2
(45) Date of Patent: Feb. 25, 2025

(54) VEHICLE DETECTION APPARATUS, METHOD AND PROGRAM

(71) Applicant: NEC Corporation, Tokyo (JP)

(72) Inventors: Murtuza Petladwala, Tokyo (JP); Shohei Kinoshita, Tokyo (JP); Shigeru Kasai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 364 days.

(21) Appl. No.: 17/908,597

(22) PCT Filed: Mar. 12, 2020

(86) PCT No.: PCT/JP2020/010715
§ 371 (c)(1),
(2) Date: Sep. 1, 2022

(87) PCT Pub. No.: WO2021/181594
PCT Pub. Date: Sep. 16, 2021

(65) Prior Publication Data
US 2023/0154314 A1    May 18, 2023

(51) Int. Cl.
*G08G 1/01* (2006.01)
*G01V 1/00* (2024.01)
*G01V 1/30* (2006.01)
*G01V 1/32* (2006.01)
*G01V 1/36* (2006.01)

(52) U.S. Cl.
CPC .......... *G08G 1/0133* (2013.01); *G01V 1/001* (2013.01); *G01V 1/30* (2013.01); *G01V 1/325* (2013.01); *G01V 1/364* (2013.01)

(58) Field of Classification Search
CPC ...... G08G 1/0133; G08G 1/065; G01V 1/001; G01V 1/30; G01V 1/325; G01V 1/364
See application file for complete search history.

(56) References Cited

U.S. PATENT DOCUMENTS 6,556,927 B1    4/2003    Latta
10,037,693 B2 *  7/2018    Ryu ................... G08G 1/065
(Continued)

FOREIGN PATENT DOCUMENTS

JP    H04-112903 U    10/1992
JP    H06-028595 A    2/1994
(Continued)

OTHER PUBLICATIONS

International Search Report for PCT Application No. PCT/JP2020/010715, mailed on Jun. 16, 2020.
(Continued)

*Primary Examiner* — Huan Le
(74) *Attorney, Agent, or Firm* — Sughrue Mion, PLLC

(57) ABSTRACT

An apparatus includes a signal acquisition part acquires oscillation signals from sensors provided under lanes of a bridge and close to an expansion joint, a signal separation part applies BSS to the oscillation signals to estimate source oscillation signals respectively separated in the plurality of lanes, and adjusts amplitude of the source oscillation signals to output amplitude adjusted oscillation signals, and a vehicle estimation part estimates, from the amplitude adjusted oscillation signal, a response oscillation due to a vehicle passing on the lane of interest to detect and count vehicles passing on the lane.

15 Claims, 20 Drawing Sheets

(56) References Cited

U.S. PATENT DOCUMENTS

| | | | | |
|---|---|---|---|---|
| 10,324,067 B2* | 6/2019 | Nagrodsky | ............ | G01M 11/30 |
| 2011/0199861 A1* | 8/2011 | Lapidot | ................. | G01V 1/001 |
| | | | | 702/14 |
| 2017/0097277 A1 | 4/2017 | Kobayashi | | |

FOREIGN PATENT DOCUMENTS

| | | |
|---|---|---|
| JP | 2002-523767 A | 7/2002 |
| JP | 2004-252520 A | 9/2004 |
| JP | 2006-084404 A | 3/2006 |
| JP | 2017-067721 A | 4/2017 |
| JP | 2017-068781 A | 4/2017 |
| JP | 2017-075821 A | 4/2017 |
| JP | 2017-091184 A | 5/2017 |

OTHER PUBLICATIONS

Kanwardeep Singh Bhachu et al., Method for Vehicle Identification and Classification for Bridge Response Monitoring Proceedings of the IMAC-XXVIII, Feb. 1-4, 2010, pp. 1-11, Jacksonville, Florida USA.

"2.1. Gaussian mixture models" in User Guide of scikit-learn, pp. 1-5, retrieved on Jan. 8, 2020, <Internet URL https://scikit-learn.org/stable/modules/mixture.html>.

David M. Blei et al., "Variational inference for Dirichlet process mixtures", 2006 International Society for Bayesian Analysis, 1, No. 1, pp. 121-144, retrieved on Jan. 8, 2020, <Internet URL http://www.cs.columbia.edu/~blei/papers/BleiJordan2004.pdf>.

* cited by examiner

Amplified estimated signal of a lane of interest

Normalized frequency spectrum

Frame-wise sum

VEHICLE DETECTION APPARATUS, METHOD AND PROGRAM

This application is a National Stage Entry of PCT/JP2020/010715 filed on Mar. 12, 2020, the contents of all of which are incorporated herein by reference, in their entirety.

FIELD

The present invention relates to a vehicle detection apparatus, method and program.

BACKGROUND

Regarding detection using a response measured on a passing vehicle over a bridge, Non-Patent Literature (NPL) 1 discloses an automatic Vehicle Detection (AVD) algorithm that takes acceleration response data (time histories) of the bridge under traffic load and gives the automatic vehicle count. The AVD algorithm of NPL 1 gives information about traffic, such as total number of vehicles (vehicle count) that have passed during an interval of time. Time headway is difference in time between a leading vehicle and a following vehicle in a highway traffic situation. Time headway ($T_{HW}$) and distance headway ($D_{HW}$) are interrelated through vehicle speed (V) by $T_{HW} = D_{HW}/V$ as illustrated in FIG. 16A and FIG. 16B which are cited from FIG. 1 and FIG. 2 of NPL1. AVD performs Vehicle Identification using a dictionary to identify a vehicle. AVD can distinguish between the two vehicles if the following condition holds: $T_{HW} \geq T_{HWmin}$, where $T_{HWmin}$ is minimum time headway. Minimum time headway ($T_{HWmin}$) is predefined in AVD and its value is set to a value with which most trucks are going to follow each other. Any pair of trucks traveling so that $T_{HW} < T_{HWmin}$ will be considered as a single vehicle. That is, AVD cannot discriminate individual ones of a pair of trucks travelling with $T_{HW} < T_{HWmin}$.

Patent Literature (PTL) 1 discloses a finger-joint based detection system wherein a strain gauge is attached to a bottom side of a finger tip of the finger joint and deflection of the finger of the finger joint generated when a vehicle passes through the joint is converted to an electric signal. The strain gauges provided at appropriate intervals in a width direction of a bridge enables traffic amount survey for each lane.

PTL 2 discloses a measurement apparatus which detects a vehicle passing on a floor slab of a bridge, based on an acceleration signal (oscillation signal) transmitted from an accelerometer which is attached on a side of the floor slab. Vehicle detection is performed using an envelope of the oscillation signal in the following way. The measurement apparatus calculates an absolute value of a vertical acceleration and calculate the envelope (signal) of the calculated absolute value. When the vehicle enters a region close to the accelerometer, a magnitude of the envelop goes high at a start time during the vehicle passes while when the vehicle enters from an opposite direction, a magnitude of the envelop goes high at an end time when the vehicle leaves the bridge.

PTL 3 discloses a system wherein multiple sensors are arranged in each lane of a bridge to detect an axle interval(s) of a vehicle passing through a bridge. In an axle passing time group, a point where the passing time difference between axles is larger than a preset value is defined as a vehicle-to-vehicle separation and an axle interval(s) for each vehicle is detected. An active load strain, a time at which the k-th axle in the lane P has passed a reference position, a speed of the k-th vehicle on the lane P, and the lane P in which the vehicle is passing is acquired. By collating the axle intervals of a vehicle passing the lane of the bridge with reference to a database in which relationship between an axle interval(s) and a vehicle type is stored in advance, the type of the vehicle passing through the bridge is automatically detected substantially in real time.

[PTL 1] Japanese Unexamined Utility Model Application Publication No. H04-112903

[PTL 2] Japanese Unexamined Patent Application Publication No. 2017-068781

[PTL 3] Japanese Unexamined Patent Application Publication No. 2006-084404

[NPL 1] Kanwardeep Singh Bhachu, J. David Baldwin, Kyran D. Mish, "Method for Vehicle Identification and Classification for Bridge Response Monitoring", Proceedings of the IMAC-XXVIII Feb. 1-4, 2010, Jacksonville, Florida USA

[NPL 2] 2.1. Gaussian mixture models, retrieved on 2020/01/08, Internet URL https://scikit-learn.org/stable/modules/mixture.html

[NPL 3] David M. Blei, Michael I. Jordan, "Variational inference for Dirichlet process mixtures", 2006 International Society for Bayesian Analysis, 1, Number 1, pp. 121-144, retrieved on 2020/01/08, Internet URL http://www.cs.columbia.edu/~blei/papers/BleiJordan2004.pdf

SUMMARY

The following analysis is made by the inventors of the present invention.

The AVD algorithm disclosed in NPL1 can identify or discriminate an individual vehicle where there is a vehicle (truck) travelling on a lane with a time headway $T_{HW}$ between the vehicle (truck) and the other one(s) preceding/succeeding thereto being more than or equal to the time headway minimum. However, the AVD algorithm cannot well identify/discriminate vehicles in following traffic situations, as illustrated in FIG. 17.

(1) A plurality of vehicles passing on parallel lanes of a bridge (parallel traffic model).

(2) A plurality of vehicles passing one after other with combination of vehicle types, e.g., a truck and a car (serial traffic model).

(3) A plurality of vehicles passing with combination of parallel traffic model (1) and serial traffic model (2) (mixture traffic model).

When vehicles are passing on parallel lanes of a bridge, presence of a vehicle on each lane generates individual vehicle specific vibration. The AVD algorithm cannot identify/discriminate vehicles passing on parallel lanes of the bridge. Combined mixture of acceleration signals (oscillation signals) is measured as shown in FIG. 18B. FIG. 18B shows a measurement result of an acceleration signal measured by an accelerometer in a parallel traffic model, wherein there are a vehicle 1 (4-axle truck) passing on lane 1 of a bridge and a vehicle 2 (2-axle car) passing on a lane 2 of the bridge, as illustrated in FIG. 18A.

FIG. 19B shows a measurement result of an acceleration measured by an accelerometer in a serial model. As illustrated in FIG. 19A, on a single lane 1, a small vehicle 2 (2-axle car) follows a large vehicle 1 (5-axle truck). The acceleration signal (oscillation signal) of the bridge induced by the small vehicle 2 is buried in the oscillation signal of the bridge induced by the large vehicle 1. The AVD algorithm disclosed in NPL 1 fails to identify the small vehicle 2 following the large vehicle 1 in serial traffic model with vehicle types combined.

FIG. 20B shows a measurement result of an acceleration measured by an accelerometer in a mixture traffic model wherein there are a vehicle 1 (3-axle truck) passing on lane 1 of a bridge and a vehicle 2 (2-axle car) following the vehicle 1 and passing on the lane 1, while there are a vehicle 3 (2-axle car) passing on lane 2 in parallel with the vehicle 1 in the lane 1 and a vehicle 4 (2-axle car) following the vehicle 3 and passing on the lane 2 as illustrated in FIG. 20A. It is noted that the measurement position of the acceleration signal (oscillation signal) below the bridge is same as proposed in the AVD algorithm disclosed in the Non-Patent Literature (NPL) 1, the signals shown in FIGS. 17, 18 and 19 correspond to same location as defined in AVD algorithm.

The AVD algorithm disclosed in NPL 1 cannot identify/discriminate individual vehicles passing on two lanes of the bridge during multiple vehicles present on the bridge as illustrated in FIG. 20A. The AVD algorithm disclosed in NPL 1 cannot identify a vehicle(s) passing in mixture of the serial case and parallel case due to the aforementioned reason.

The AVD algorithm disclosed in NPL 1 uses a threshold-based dictionary. Creating a dictionary for combinations of vehicle types is time consuming and very complex.

Accordingly, it is one of objects of the present invention to provide a detection apparatus, a method, a non-transitory medium storing a program, each enabling to detect and identify vehicles passing on parallel lanes on a bridge.

According to one aspect of the disclosure, there is provided a detection apparatus comprising:
  a signal acquisition part that acquires a plurality of oscillation signals from a plurality of sensors, respectively, each sensor provided for each lane of a bridge that includes a plurality of lanes running in parallel and capable of sensing oscillation of the bridge induced by an individual axle of a vehicle passing on the lane;
  a signal separation part that receives, from the signal acquisition part, the plurality of the oscillation signals, applies blind source separation (BSS) to the plurality of the oscillation signals to estimate and separate a plurality of source oscillation signals, each source oscillation signal specific to each lane, and adjusts amplitude of an individual one of the plurality of the source oscillation signals to output a plurality of amplitude adjusted oscillation signals; and
  a vehicle estimation part that receives the amplitude adjusted oscillation signal corresponding to the lane of interest from the signal separation part, and estimates, from the amplitude adjusted oscillation signal, a response oscillation due to a vehicle passing on the lane of interest to detect and count individual vehicles passing on the lane of interest.

According to a second aspect of the disclosure, there is provided a computer-based vehicle detection method comprising:
  acquiring a plurality of oscillation signals from a plurality of sensors, respectively, each sensor provided for each lane of a bridge that includes a plurality of lanes running in parallel and capable of sensing oscillation of the bridge induced in the lane by an individual axle of a vehicle passing on the lane;
  performing signal separation processing comprising:
    applying blind source separation (BSS) to the plurality of the oscillation signals to estimate and separate a plurality of source oscillation signals, each source oscillation signal specific to each lane; and
    adjusting amplitude of an individual one of the plurality of the source oscillation signals to output a plurality of amplitude adjusted oscillation signals; and
  performing estimation processing comprising:
    receiving the amplitude adjusted oscillation signal corresponding to the lane of interest output from the signal separation processing; and
    estimating, from the amplitude adjusted oscillation signal, a response oscillation due to a vehicle passing on the lane of interest to detect and count individual vehicles passing on the lane of interest.

According to a third aspect of the disclosure, there is provided a recording medium storing therein a program for causing a computer to execute processing comprising:
  acquiring a plurality of oscillation signals from a plurality of sensors, respectively, each sensor provided for each lane of a bridge that includes a plurality of lanes running in parallel and capable of sensing oscillation of the bridge induced in the lane by an individual axle of a vehicle passing on the lane;
  performing signal separation processing comprising:
    applying blind source separation (BSS) to the plurality of the oscillation signals to estimate and separate a plurality of source oscillation signals, each source oscillation signal specific to each lane; and
    adjusting amplitude of an individual one of the plurality of the source oscillation signals to output a plurality of amplitude adjusted oscillation signals; and
  performing estimation processing comprising:
    receiving the amplitude adjusted oscillation signal corresponding to the lane of interest output from the signal separation processing; and
    estimating, from the amplitude adjusted oscillation signal, a response oscillation due to a vehicle passing on the lane of interest to detect and count individual vehicles passing on the lane of interest.

According to the disclosure, there is provided a computer-readable recording medium in which the program according to the above described third aspect of the disclosure is stored. The recording medium may be such as a semiconductor storage (such as read only memory (ROM), random access memory (RAM), electrically and erasable programmable read only memory (EEPROM)), Hard Disk Drive (HDD), Solid State Drive (SSD), Compact Disc (CD) or Digital Versatile Disc (DVD) etc.

According to a further aspect of the disclosure, there is provided a vehicle detection apparatus comprising:
  a signal acquisition part that acquires a plurality of oscillation signals from a plurality of sensors, respectively, each sensor provided for each lane of a bridge that includes a plurality of lanes running in parallel and capable of sensing oscillation induced by a vehicle passing on the lane;
  a vehicle estimation part that obtains a frequency spectrum of each frame of the oscillation signal by applying Fourier transform to the each frame extracted from the oscillation signal by a sliding window and calculates a sum of a normalized frequency vector, from the frequency spectrum of the each frame, for each lane, to generate a maximum vector with each element thereof being a max value of the sum of a normalized frequency vectors calculated for the plurality of lane, generates a binary vector with columns, number of which is equal to number of the sums of normalized frequency vectors and with rows, an element of which corresponds to a time index and has a value 1 at an element position with a maximum value and 0 otherwise, obtains time repeated vectors of the sum of a normalized frequency vectors and maximum vectors by multiplying a time value by a magnitude value of each of the vectors, performs Gaussian mixture model-clustering on the time repeated vector to count number of clusters and finds start time and end time of presence of a vehicle in each lane, and calculates a column-wise mean value of elements corresponding to the start time and the end time, in a row of the binary matrix to decide that the vehicle is present in a lane corresponding to a column of the binary matrix for which the column-wise mean value is calculated if the column-wise mean value is not less than a predetermined threshold value, while if the column-wise mean value is less than a predetermined threshold value for all columns of the binary matrix, deciding that the vehicle is present in the plurality of lanes. There are provided a method, program, a non-transitory medium that correspond to the further aspect of the disclosure.

According to the present invention, it is made possible to detect and identify vehicles passing on parallel lanes on a bridge. Still other features and advantages of the present invention will become readily apparent to those skilled in this art from the following detailed description in conjunction with the accompanying drawings wherein only example embodiment of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1A:
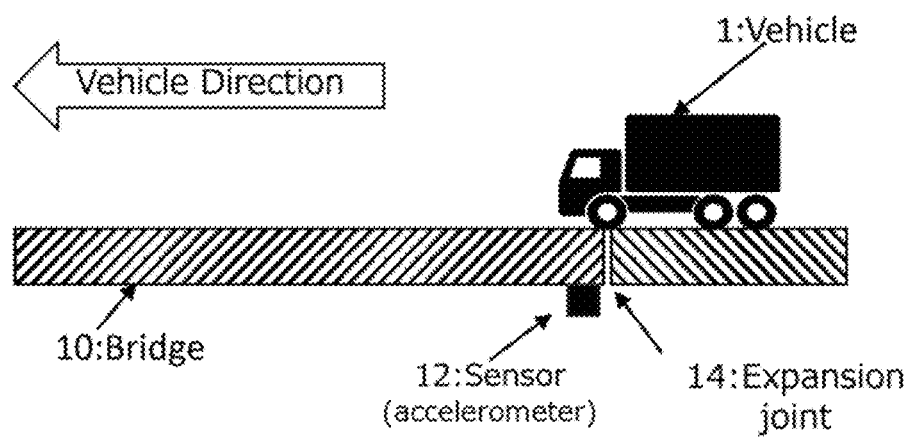
FIGS. 1A and 1B are diagrams illustrating an embodiment of the invention.
Figure 1B:
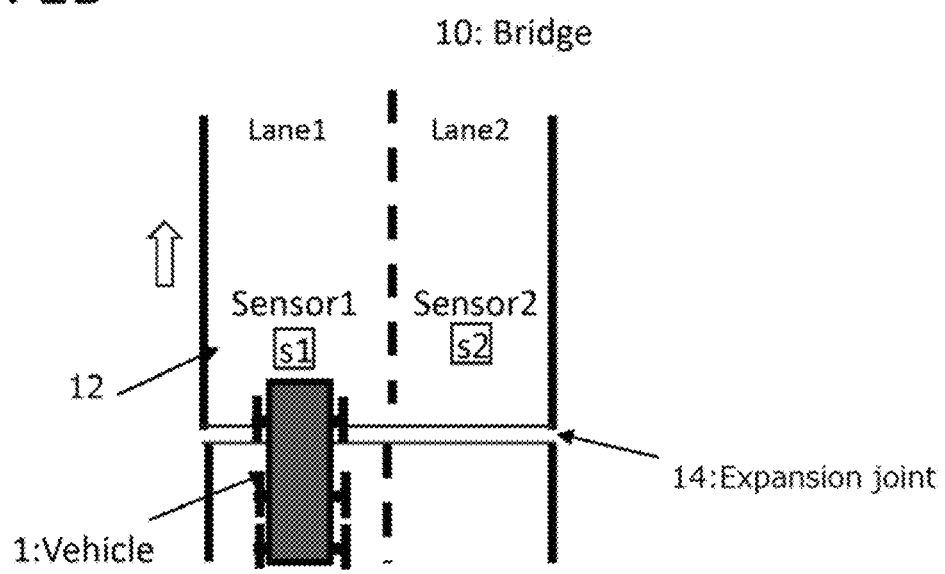

The following describes an example embodiment with reference to drawings. FIG. 1 is a schematic diagram illustrating the example embodiment of the present invention. FIG. 1A is a schematic illustration of a side view, while FIG. 1B is a schematic illustration of a plan view. Referring to FIG. 1, an expansion joint 14 is a joint provided between separate structures with different properties for accommodating movement, shrinkage, and temperature variations on reinforced and pre-stressed concrete, composite, and steel structures. An accelerometer is used as a sensor 12 for detecting acceleration (i.e., oscillation) of the bridge induced by a vehicle 1 passing on a lane of the bridge 10 to convert the oscillation to an electric signal. The sensor (accelerometer) 12 is provided below a concrete slab of the bridge 10 at least on an edge point of the bridge 10. Acceleration data (oscillation signal) captured by the accelerometer is transmitted in digital data via wired or wireless communication to a vehicle detection apparatus not shown.

Figure 2:
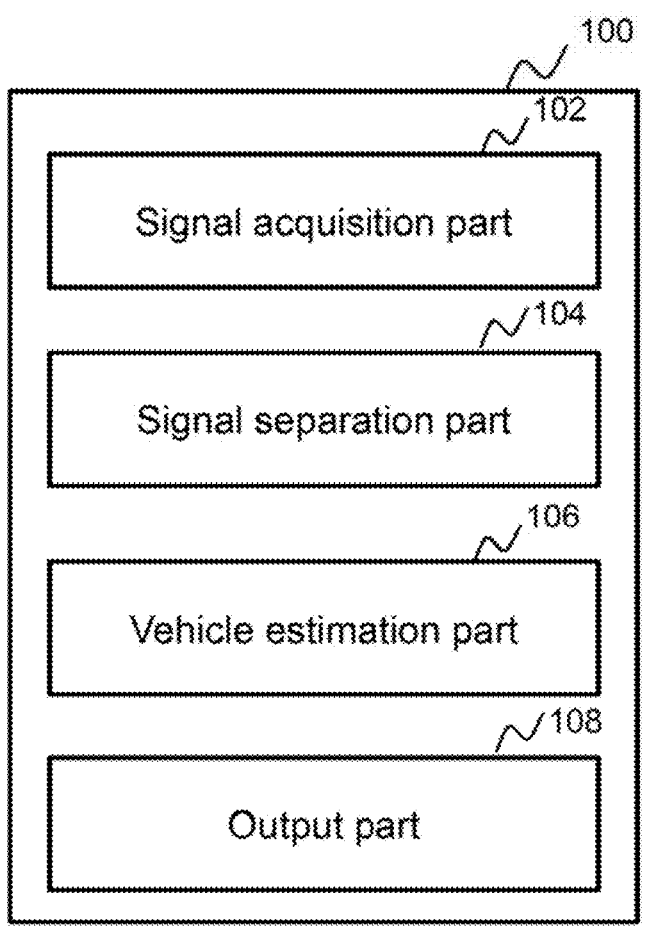
FIG. 2 is a diagram illustrating an arrangement of a vehicle detection system of the embodiment.

FIG. 2 is a schematic diagram illustrating an example of an arrangement of a vehicle detection apparatus of the example embodiment. Referring to FIG. 2, the vehicle detection apparatus 100 includes a signal acquisition part 102, a signal separation part 104, a vehicle estimation part 106, and an output part 108. The signal acquisition part 102 acquires acceleration data from the sensors s1 and s2 which are communicatively connected to the signal acquisition part 102. The acceleration data includes an impulse response(s) of the lane, the impulse being given to the bridge 10 by axles of the vehicle passing over the bridge. The acceleration data (oscillation signals) from the sensors s1 and s2 are synchronized in time, that is, the acceleration data sampled by the sensors s1 and s2 at the same sampling time are received by the signal acquisition part 102, as data of the same index in time series acceleration data vector. The signal separation part 104 receives, from the signal acquisition part 102, respective acceleration data (oscillation signals) acquired by the sensors s1 and s2 and applies blind source separation (BSS) to acceleration data (oscillation signals) from the sensors s1 and s2 to separate each oscillation signal specific to each lane. The vehicle estimation part 106 detects and counts individual vehicles in each lane, based on the oscillation signal specific to each lane which has been separated by the signal separation part 104. The vehicle estimation part 106 calculates time repletion feature from peaks of an amplitude of the oscillation signal separated to each lane and performs clustering on time repletion feature to detect presence of a vehicle(s) on each lane. The output part 108 outputs the detection result to a display apparatus in a storage apparatus, or via a communication network to a terminal or a computer system. The signal acquisition part 102, signal separation part 104, vehicle estimation part 106, and output part 108 may be implemented by a processor that is included in the vehicle detection apparatus 100 and execute program instructions stored in a memory included in the vehicle detection apparatus 100.

Figure 3A:
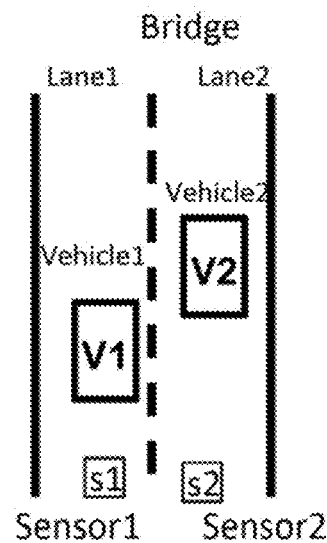
FIGS. 3A to 3C are diagrams illustrating lane separation by BSS.
Figure 3B:
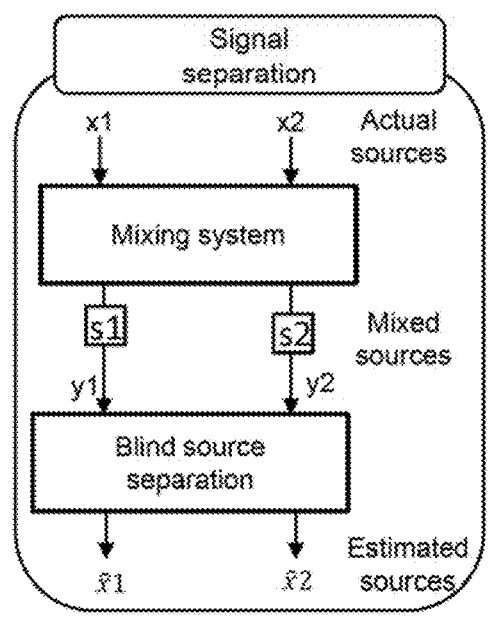
Figure 3C:
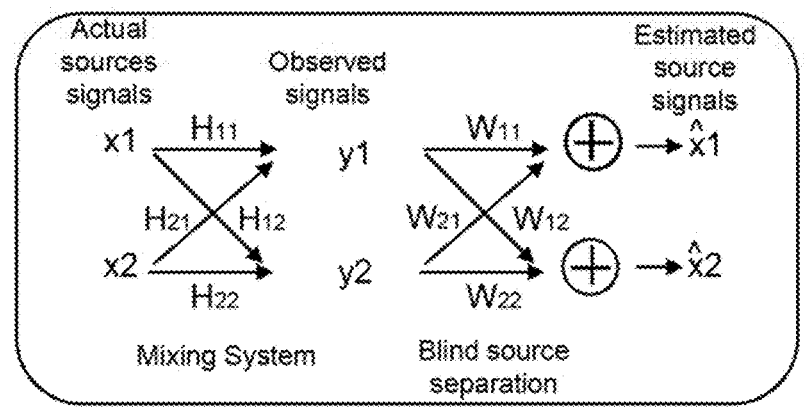

FIGS. 3A-3C are schematic illustration of the blind source separation (BSS) which separates a set of source signals from a set of mixed signals, without aid of information about the source signals or a mixing system.

BSS is used with an assumption that measured vibration responses can be separated to estimate individual vibration response of each lane. In FIG. 3A, two vehicles are passing in lane 1 and lane 2 on the bridge. The sensors s1 and s2 captures oscillation mixed signal $y_1$ and $y_2$ which are outputs of a mixing system which mixes actual source signals (oscillation signals) $x_1$ and $x_2$ of the lane 1 and lane 2 respectively, as illustrated in FIG. 3B and FIG. 3C.

$$y_j(n) = \Sigma_{i=1}^{2} \Sigma_{p=1}^{P} H_{ji}(p) x_i(n-p+1) \quad (1)$$

where $x_i$ is a signal from actual source, $y_j$ is a signal captured by the sensor (accelerometer) $s_j$ (j=1,2), and $H_{ji}$ is a mixing matrix from actual source to the sensor (accelerometer) $s_j$. Outputs of BSS are given as follows.

$$\hat{x}_i(n) = \Sigma_{j=1}^{2} \Sigma_{q=1}^{Q} W_{ij}(q) y_j(n-q+1) \quad (2)$$

where $\hat{x}_i$ (i=1,2) is a separated signal, and $W_{ij}$ is a separation filter with Q taps.

In a case of p=1 and q=1, as illustrated in FIG. 3B and FIG. 3C.

$$y_1(n) = H_{11}x_1(n) + H_{21}x_2(n)$$

$$y_2(n) = H_{12}x_1(n) + H_{22}x_2(n)$$

$$\hat{x}_1(n) + W_{11}y_1(n) + W_{21}y_2(n)$$

$$\hat{x}_2(n) + W_{12}y_1(n) + W_{22}y_2(n) \quad (3)$$

Figure 4:
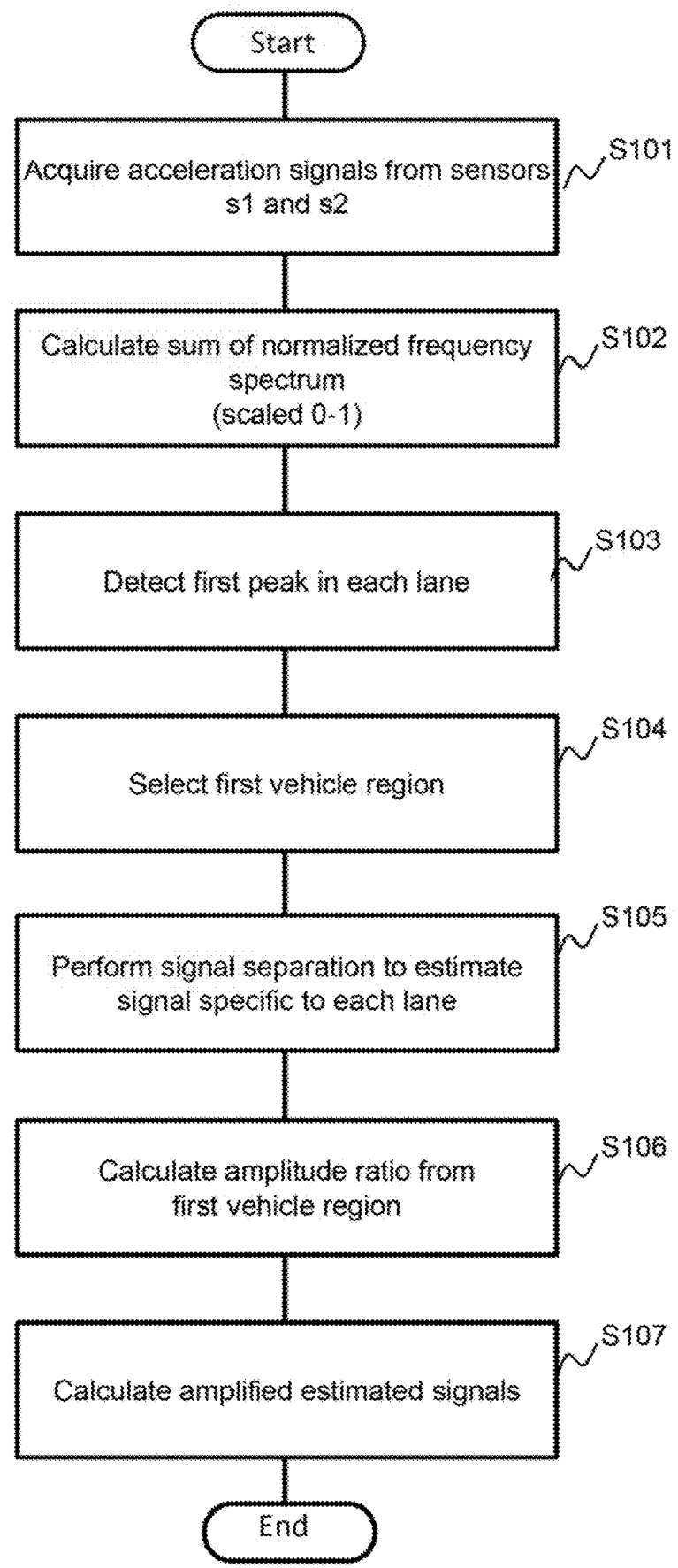
FIG. 4 is a flowchart illustrating an operation example of the embodiment.

FIG. 4 is a flowchart of the embodiment. Referring FIG. 4, the signal acquisition part 102 acquires oscillation signals (time domain signals) from sensors s1 and s2 (S101). The signal acquisition part 102 may cut off a DC component of the oscillation signal.

The signal separation part 104 calculates a sum of a normalized frequency spectrum (S102). More specifically, the signal separation part 104 extracts waveform data (frame) using a sliding window of a time interval T (length of one frame) and perform FFT (fast Fourier transform) to the extracted waveform data to obtain a frequency spectrum, which is normalized by dividing each frequency component (amplitude) by a total sum value of frequency components (amplitudes) of the frequency spectrum. The signal separation part 104 calculates a sum of a normalized frequency spectrum for each frame of the waveform data acquired by the sensors s1 and s2.

Figure 5A:
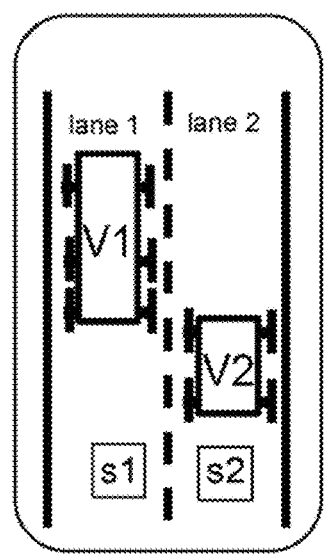
FIGS. 5A to 5C are diagrams illustrating an example of the embodiment.
Figure 5B:
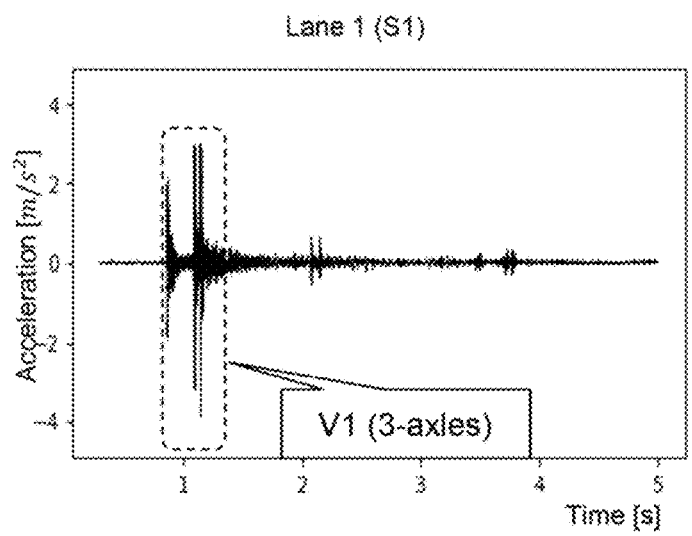
Figure 5C:
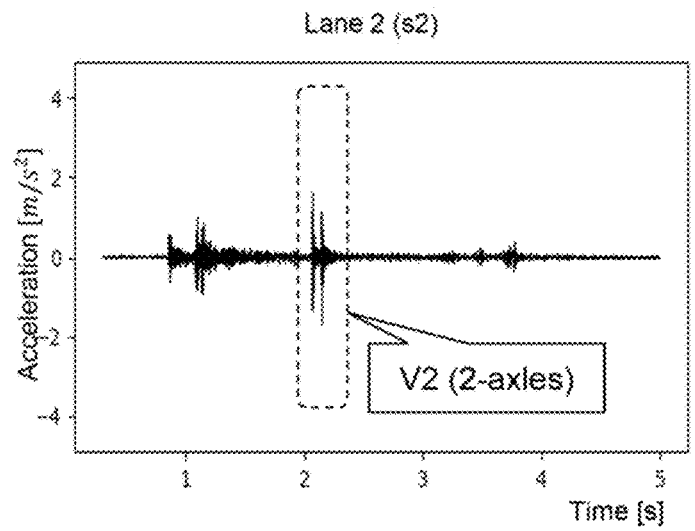

FIG. 5 is a diagram for explaining the embodiment. It is assumed that a vehicle 1 (truck) with 3 axles is passing in the lane 1 and a vehicle 2 (car) with 2 axles is passing in the lane 2, as illustrated in FIG. 5A. FIGS. 5B and 5C show waveform data (oscillation signals) acquired by the sensors s1 and s2 provided in lane 1 and lane 2 where the vehicle 1 (3-axle truck) and vehicle 2(2-axle car) are passing, respectively. In FIGS. 5B and 5C, a horizontal axis is a time and a vertical axis is an acceleration[m/s²].

Figure 6A:
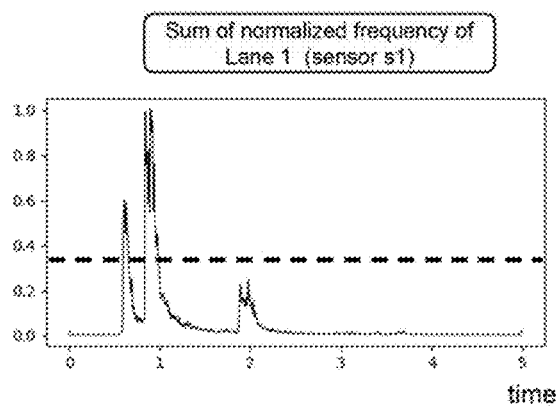
FIGS. 6A to 6D are diagrams illustrating an example of the embodiment.
Figure 6B:
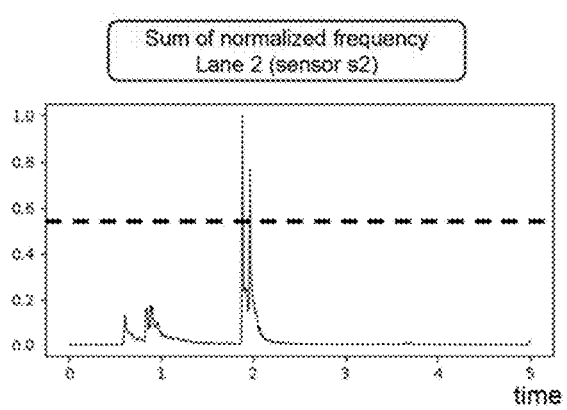

FIG. 6A shows time series of a sum of the normalized frequency spectrum of lane 1 and FIG. 6B shows time series of a sum of the normalized frequency spectrum of lane 2. In FIGS. 6A and 6B, a sum of the normalized frequency spectrum for each frame are plotted along a time axis (horizontal axis).

The frequency component is normalized by a combined sum of the frequency spectrums of the oscillation signals (each frame). In case of FIG. 6A, the sum of normalized frequency of the frame acquired by the sensor s1 (lane 1) is given by the following equation:

$$\text{Sum of normalized frequency } (s1) = \text{sum}\left(\frac{\text{spectrum }(s1)}{\text{sum of }(\text{spectrum}(s1), \text{spectrum }(s2))}\right) \quad (4)$$

where spectrum (s1) is a vector having, as each element, an amplitude spectrum of each frequency bin in the frequency spectrum of the frame of the oscillation signal acquired by the sensor s1, spectrum (s2) is a vector having, as each element, an amplitude spectrum of each frequency bin in the frequency spectrum of the frame of the oscillation signal acquired by the sensor s2, sum of (spectrum (s1), spectrum (s2)) is a combined sum operation which adds each amplitude spectrum at each element of the vector spectrum (s1) and the vector spectrum (s2) to generate a scaler value (sum) by summing the added amplitude spectrums, spectrum (s1)/sum of (spectrum (s1), spectrum (s2)) is an operation of dividing an amplitude spectrum of each element (frequency bin) in the vector spectrum (s1) by the sum of (spectrum (s1), spectrum (s2)) to obtain a normalized amplitude spectrum of each element (frequency bin) in the spectrum (s1), and sum ( ) is an operation of summing each normalized amplitude spectrum of each element (frequency bin) in the spectrum (s1).

In case of FIG. 6B, the sum of normalized frequency of the frame acquired by the sensor s2 (lane 2) is given, as with the expression (4), by the following expression:

$$\text{Sum of normalized frequency } (s2) = \text{sum}\left(\frac{\text{spectrum }(s2)}{\text{sum of }(\text{spectrum}(s1), \text{spectrum }(s2))}\right) \quad (5)$$

Figure 6C:
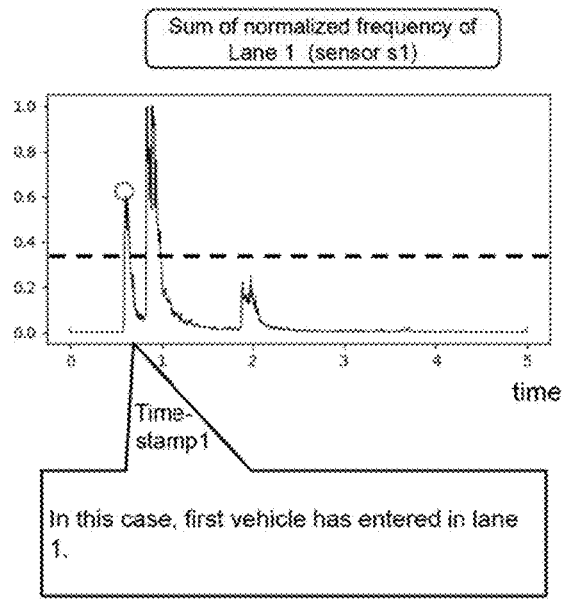
Figure 6D:
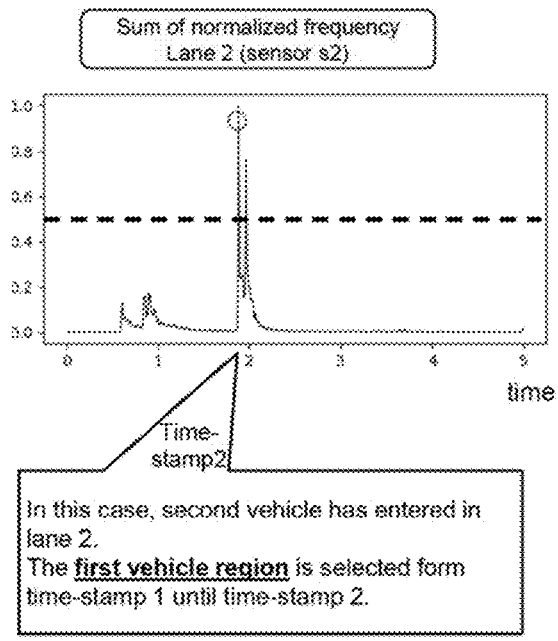

The signal separation part 104 detects a first peak in the sum of the normalized frequency spectrum of each of lane 1 and lane 2 (S103). FIG. 6C shows a sum of normalized frequencies of the lane 1 (sensor s1) where a first peak designated by a small circle indicates that a first vehicle has entered in the lane 1. FIG. 6D shows a sum of normalized frequencies of the lane 2 where a first peak designated by a circle indicates that a second vehicle has entered in the lane 2. Using a peak(s) of the sum of normalized frequencies, the signal separation part 104 determines a region boundary between a first vehicle region that is a time interval during when a vehicle enters in one of the lanes and there is no vehicle entering in the other lane and a mixed signal region is a time interval during when there are vehicles entering in both lanes. The signal separation part 104 selects a first vehicle region from a time-stamp of the first peak of FIG. 6C until the time-stamp of the first peak of FIG. 6D (S104).

Figure 7:
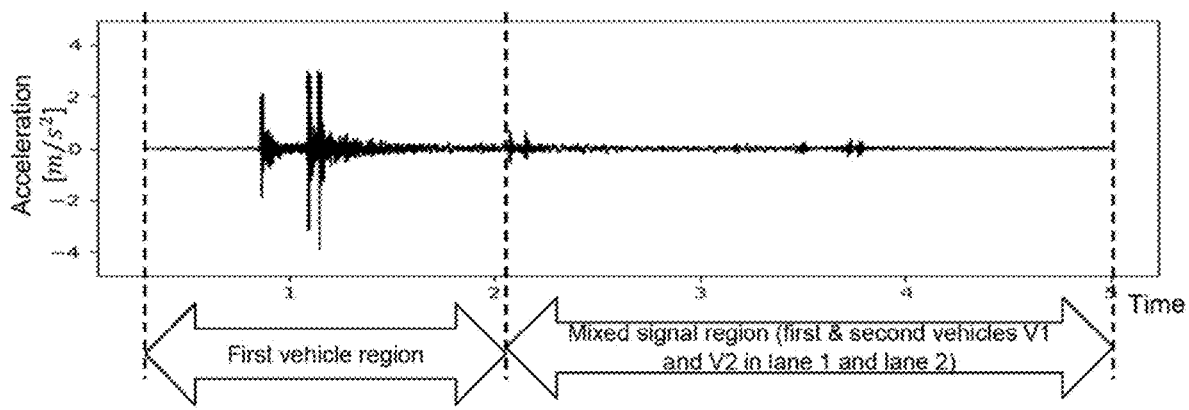
FIG. 7 is a diagram illustrating an example of the embodiment.

FIG. 7 shows the first vehicle region and mixed signal region which are mapped to the oscillation signal (time domain signal) of lane 1 (FIG. 5B) acquired by the sensor s1. The signal separation part 104 stores the time domain signals of lane 1 and lane 2 (FIG. 5B and FIG. 5C) in a semiconductor memory (e.g., RAM (Random Access Memory or EEPROM (Electrically Erasable Programmable Read-Only Memory)), or a storage unit (e.g., HDD (Hard Disk Drive) or SSD (Solid State Drive)) provided in the vehicle detection apparatus.

The signal separation part 104 applies BSS to time domain signals (FIG. 5B and FIG. 5C) including the first regions and the mixed signal region to obtain estimated source signals ($\hat{x}1$ and $\hat{x}2$ in FIG. 3C). (S105).

Figure 8A:
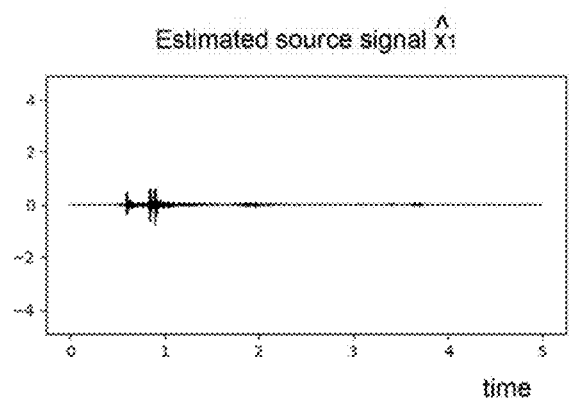
FIGS. 8A to 8D are diagrams illustrating an example of the embodiment.
Figure 8B:
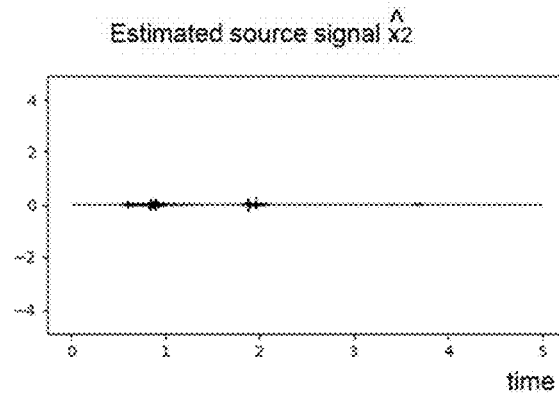

FIG. 8A and FIG. 8B show the estimated source signals $\hat{x}1$ of lane 1 and $\hat{x}2$ of lane 2 which have been estimated by the BSS.

The signal separation part 104 calculates an amplitude ratio $\alpha$ by dividing a sum of power spectrum of the first vehicle region of measured time domain signal by a sum of power spectrum of the first vehicle region of time domain signal estimated by BSS.

$$\alpha = \frac{\text{sum of power spectrum of first vehicle region\_measured}}{\text{sum of power spectrum of first vehicle region\_estimated}} \quad (6)$$

The signal separation part 104 multiplies the amplitude ratio $\alpha$ to the estimated signals $\hat{x}1$ and $\hat{x}2$ to obtain amplified estimated signals $\alpha \cdot \hat{x}1$ and $\alpha \cdot \hat{x}2$.

Figure 8C:
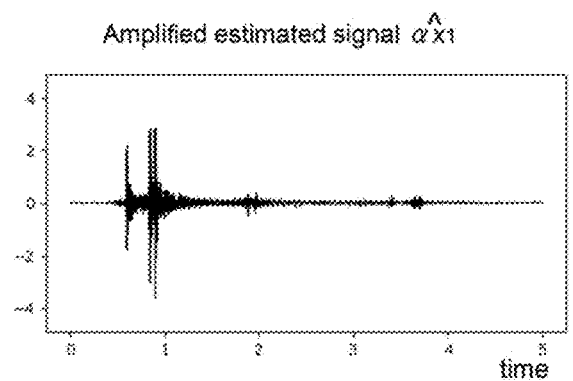
Figure 8D:
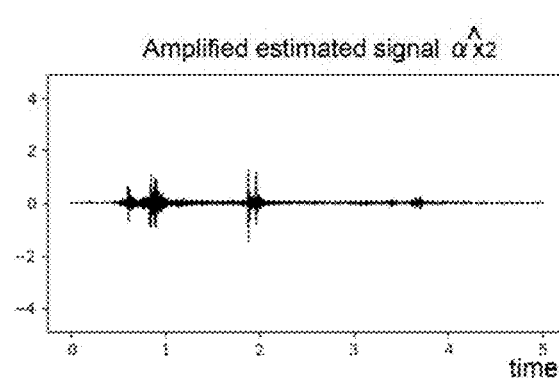

FIG. 8C and FIG. 8D show respectively amplified estimated signals $\alpha \cdot \hat{x}1$ and $\alpha \cdot \hat{x}2$ of lane 1 and lane 2 which are obtained by multiplying the amplitude ratio $\alpha$ to the estimated source signals $\hat{x}1$ and $\hat{x}2$ of lane 1 and lane 2 shown in FIG. 8A and FIG. 8B.

The following describes an example of the operation of the vehicle estimation part 106 which can detect and count vehicles passing one after other with combination of vehicle types, e.g., a truck and a car (serial model), in a single lane of interest (one of lane 1 and lane 2) individually, based on one of amplified estimated signals $\alpha \cdot \hat{x}1$ and $\alpha \cdot \hat{x}2$.

Figure 9A:
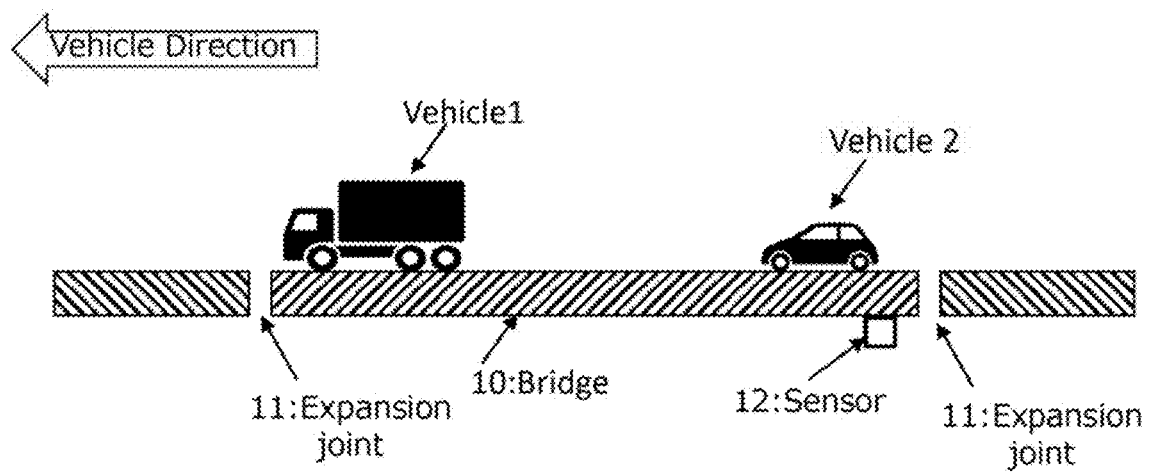
FIGS. 9A and 9B are diagrams illustrating an example of the embodiment.
Figure 9B:
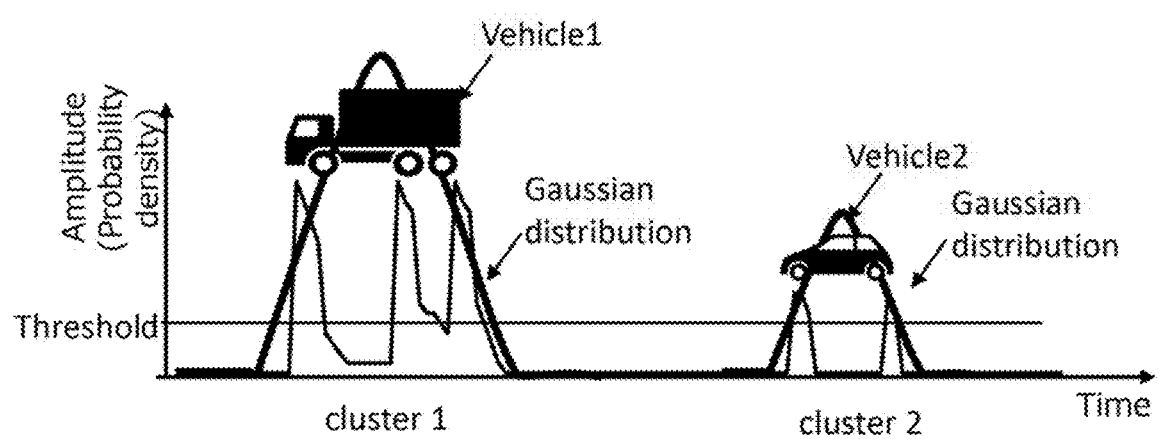

FIG. 9A illustrates a serial case where a vehicle 1 (3-axle truck) and a vehicle 2 (2-axle car) following the vehicle 1 are present on the lane 1 of the bridge 10. The vehicle 2 is preferably spaced apart from the vehicle 1 by a time interval of e.g., about 0.5 second or more. FIG. 9B illustrates estimation of the number of vehicles based on clustering using a Gaussian mixture model with Dirichlet process prior. The number of Gaussian probability density function(s) obtained by the clustering and taking a value greater than a predetermined threshold value is counted as the number of vehicles.

Figure 10:
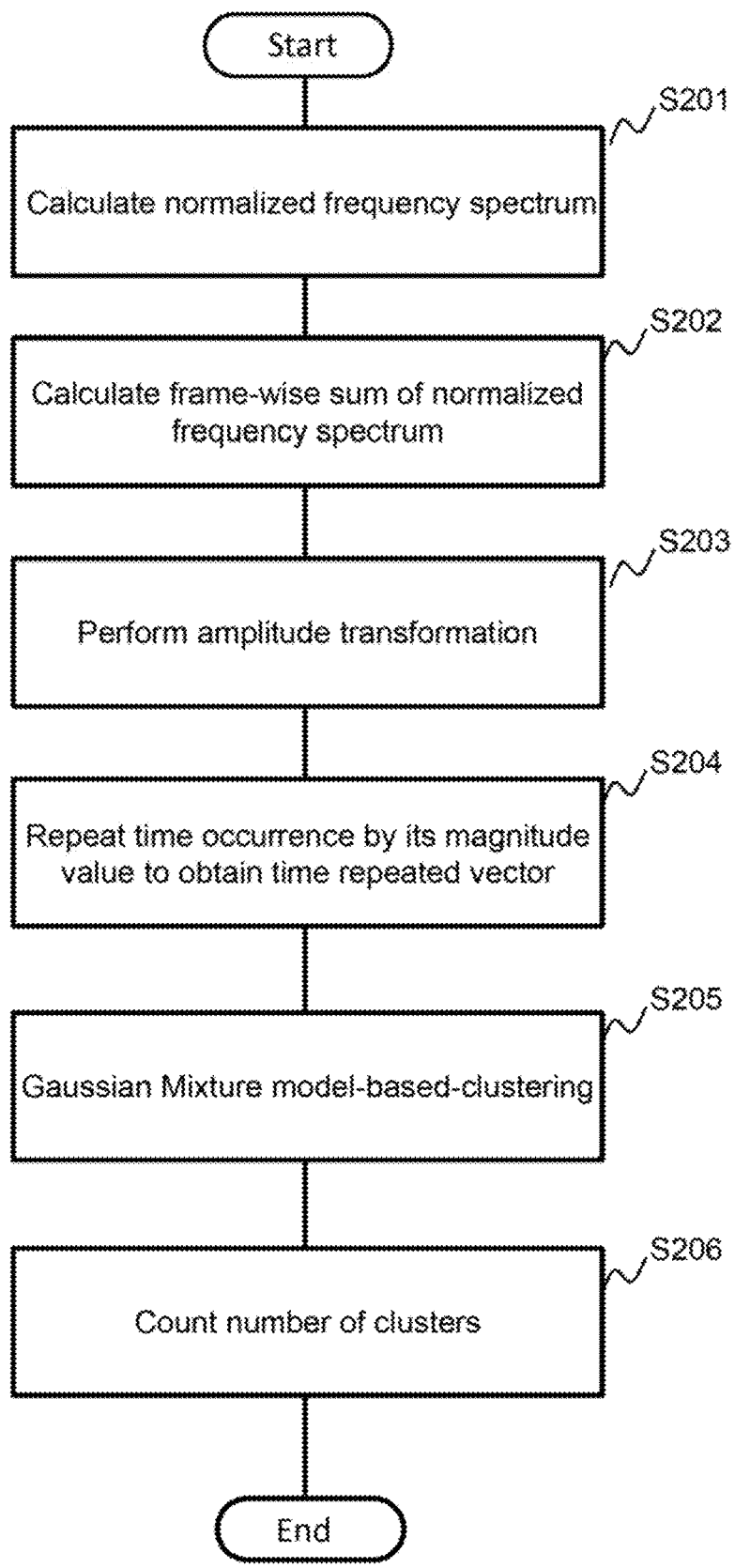
FIG. 10 is a flowchart illustrating an operation example of the embodiment.

FIG. 10 is a flow chart illustrating an operation example of the vehicle estimation part 106 which detects the number of vehicles passing a lane.

Figure 11A:
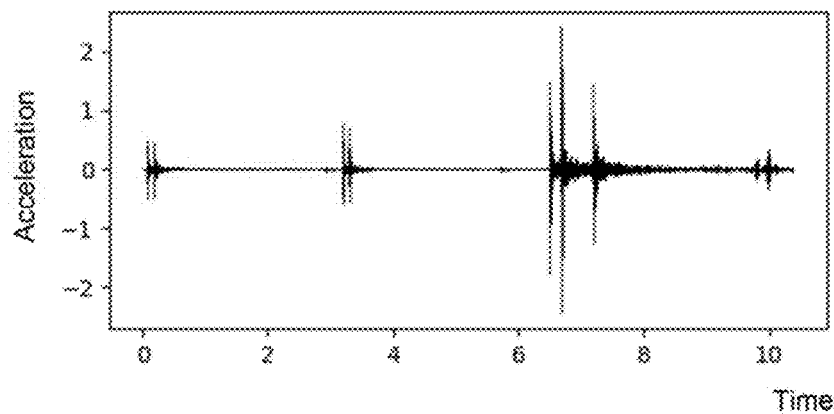
FIGS. 11A to 11C are diagrams illustrating an example of the embodiment.

It is assumed that the vehicle estimation part 106 receives from the signal acquisition part 102, the oscillation signal, i.e., the amplified estimated signal of a lane of interest, as shown in FIG. 11A.

The vehicle estimation part 106 is configured to detect a vehicle (s) passing serially on a single lane (e.g., lane 1) from the oscillation signal of lane 1 captured by the sensor s1.

Figure 11B:
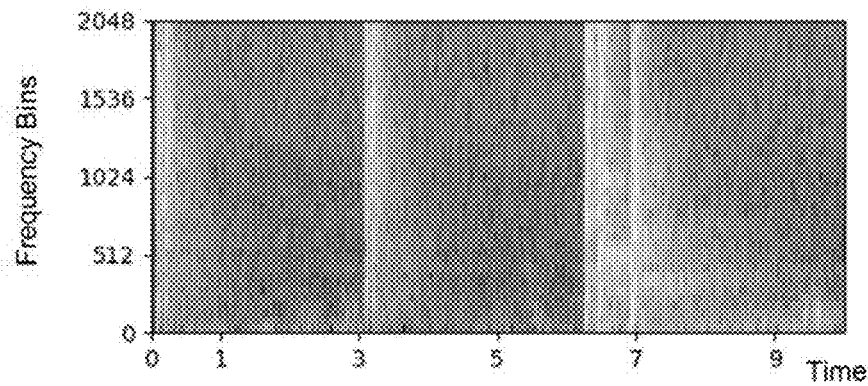

The vehicle estimation part 106 calculates a normalized frequency spectrum (S201). FIG. 11B shows a normalized frequency spectrum of the signal shown in FIG. 11A. More specifically, the vehicle estimation part 106 applies short-time (term) FFT (Fast Fourier Transform) (STFT) to the oscillation signal shown in FIG. 11A. That is, using a sliding window of a predetermined length (length of one frame), each shifted by predetermined value, each frame is extracted from the oscillation signal. The neighboring frames have overlapping portion. FFT is applied to each frame to obtain a frequency spectrum of each frame. Discrete Fourier transform (DFT) may as a matter of course be used in place of FFT.

Let's $X_t=[x^0, x^1 \ldots x^{N-1}, x^N \ldots]$ be time series of sampled values $x^k$ (where k is non-negative integer) of the oscillation signal with a shift of the sliding window=m, frames $X_j$ (j=1,2,3 ...) with length N (N>m) are extracted by the sliding window from the oscillation signal and FFT is applied to each frame to obtain a frequency spectrum $Y(\omega)_j$ of the j-th frame $X_j$ (j=1,2,3 ...), $$X_1=[x^0, \ldots, x^{N-1}] \rightarrow Y(\omega)_1 = FFT(X_1)$$

$$X_2=[x^{m-1}, \ldots, x^{N+m-2}] \rightarrow Y(\omega)_2 = FFT(X_2)$$

$$X_3=[x^{2m-1}, \ldots, x^{N+2m-3}] \rightarrow Y(\omega)_3 = FFT(X_3)$$

The vehicle estimation part 106 calculates a normalized frequency spectrum by dividing each frequency component (amplitude) by a total sum of amplitudes of the frequency components of the frequency spectrum. The total sum of amplitude spectrum $q_j$ for j-th frame $X_j$ is given by $$S_j = \sum_{i=1}^{\frac{N}{2}-1} q_j(i) \quad (7)$$

where $q_j(i)$ is an amplitude of i-th frequency bin of the frequency spectrum $Y(\omega)_j$ of the j-th frame $X_j$.

$$q_j(i) = \sqrt{\text{Re}(y_j(i))^2 + \text{Im}(y_j(i))^2} \quad (8)$$

where $y_j(i)$ (i=1, ..., N/2−1) is an i-th frequency component (bin) of the frequency spectrum $Y(\omega)_j$. Re( ) and Im ( ) are real part and imaginary part of complex $y_j(i)$ where $y_j(0)$ (i=0) is a DC component, an imaginary part of which is zero and a real part of which is assumed to be zero, and an index i=N/2 corresponds to the Nyquist frequency bin.

The normalized frequency spectrum Q for the j-th frame X is given as $$Q_j = \left(\frac{1}{S_j}\right)\left[q_j(1), \ldots, q_j\left(\frac{N}{2}-1\right)\right] \quad (9)$$

The vehicle estimation part 106 calculates a frame-wise sum of a normalized frequency spectrum (S202).

The frame-wise sum f(j) of a normalized frequency spectrum for j-th frame $X_j$ (j=1, 2, ...) is given as $$f(j) = \sum_{i=1}^{\frac{N}{2}-1} q_j(i) \quad (10)$$

Figure 11C:
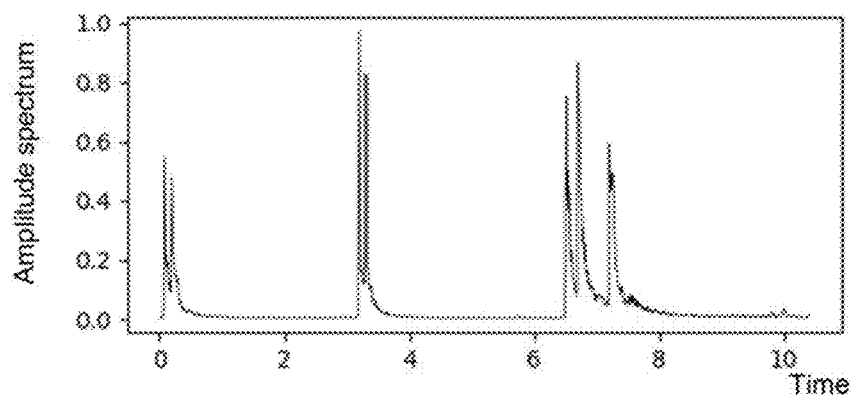

FIG. 11C shows frame-wise sum for each frame. In FIG. 11C, values of the frame-wise sum f(j) (j=1,2,3, ...) are plotted, where a horizontal axis is a time axis (i.e., index j=1,2,3, ...) and a vertical axis is the value of the frame-wise sum: f(j). FIG. 11C is a plot of the following vector (frame-wise sum vector), $$F=(f(1), f(2), f(3), \ldots) \quad (11)$$

Figure 12A:
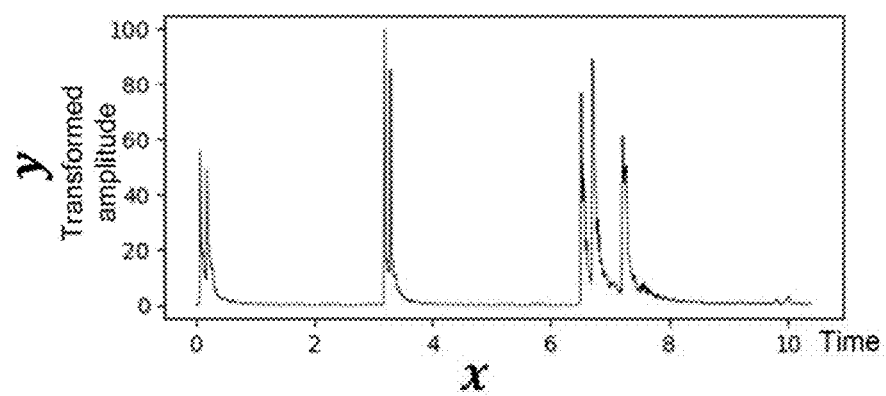
FIGS. 12A to 12C are diagrams illustrating an example of the embodiment.

The vehicle estimation part 106 performs amplitude transformation of the vector F to scale in pre-defined range (S203). FIG. 12A shows a result of amplitude transformation of the frame-wise sum vector shown in FIG. 11C. In the example of FIG. 12A, the vector F in FIG. 11C is transformed to a vector F_scaled of a range between 0 and 100, though not limited thereto.

scaled_min=0, scaled_max=100,

F_min=min(F),

F_max=max(F).

The amplitude transformation is calculated as:

$$F\_scaled = scale * F + scaled\_min - F\_min * scale \quad (12)$$

where $$scale = (scaled\_max - scaled\_min)/(V\_max - V\_min) \quad (13)$$

Figure 12B:
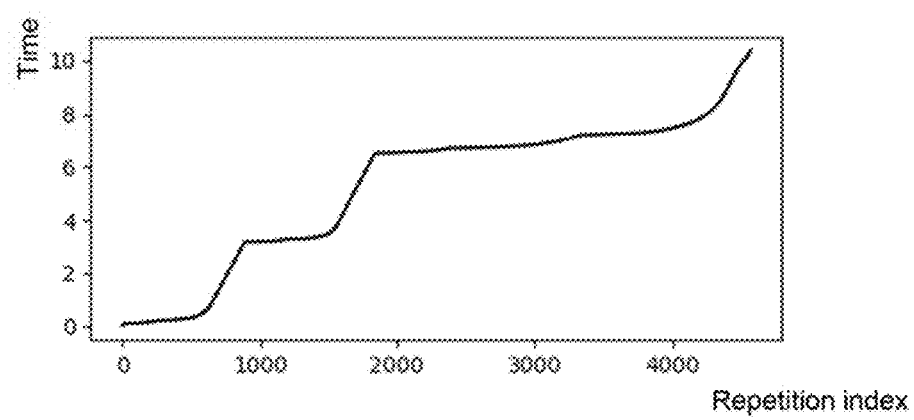

The vehicle estimation part 106 creates a new vector (time-repeated vector) from the vector F_scaled by repeating time value by its magnitude value (S204). FIG. 12B shows an example of the new vector (time-repeated vector), where a vertical axis is a time axis and a horizontal axis is a repetition index. More specifically, the vehicle estimation part 106 repeats time occurrence by its magnitude. The vehicle estimation part 106 repeats x (time value) by y (scaled amplitude) times, i.e., (time value)*(scaled amplitude at the corresponding time). For example, in FIG. 13A, at time: 0 (index 0 of F_scaled), scaled amplitude (value of an element 0 of F_scaled) is 2, so time-repeated vector V starts with a time value 0 repeating 2 times, next, at time: 1 (index 1 of F_scaled), scaled amplitude (value of an element 1 of F_scaled) is 10, so repeating a time value 1 by 10 times. After the multiplication for all time value is iterated, we have a new time-repeated vector V as shown in FIG. 12B. In FIG. 12B, a time axis (horizontal axis) is an index of each element of the time-repeated vector V and a vertical axis is a value of each element of the time-repeated vector V.

Figure 12C:
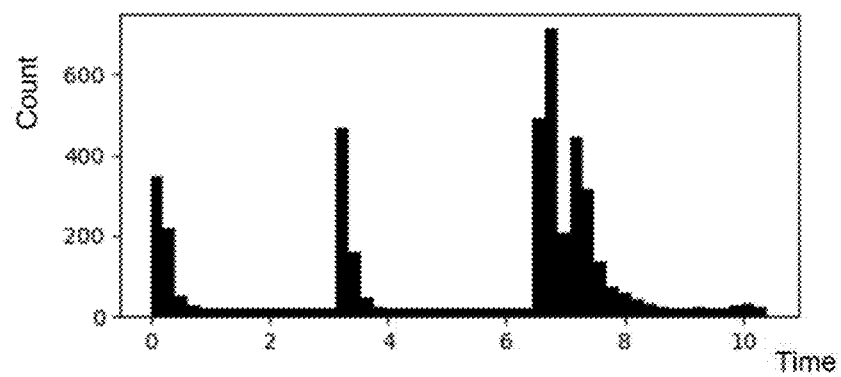

Assuming that each vehicle is estimated based on a Gaussian Mixture model, transforming the signal to time-repeated feature makes it easy to perform clustering and vehicle detection by Gaussian Mixture Modelling. A vehicle occurrence time in the oscillation signal is not known. To detect the vehicle occurrence time, repeating time value by a scaled amplitude times is adopted, which generates more density at a peak location of the amplitude. This operation results in an expected distribution (such as Gaussian probability distribution) at each vehicle occurrence, as shown in FIG. 12C, which is a histogram (time axis histogram) of the time-repeated vector created by the vehicle estimation part 106.

Figure 13A:
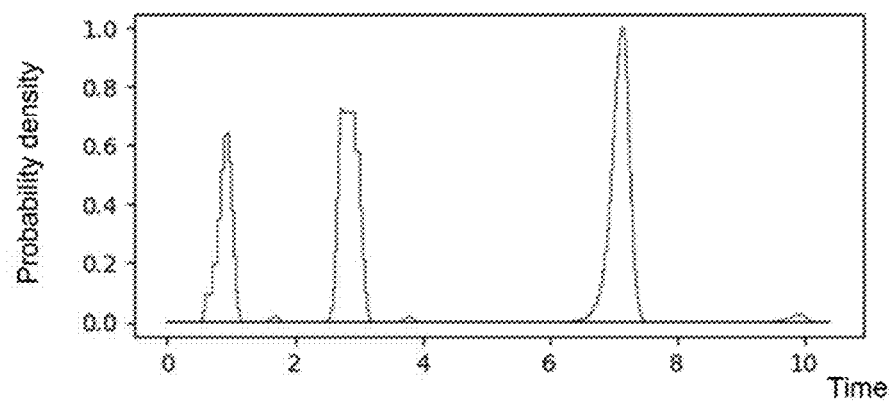
FIGS. 13A and 13B are diagrams illustrating an example of the embodiment.

The vehicle estimation part 106 performs clustering based on learning (unsupervised model training) of a mixture of Gaussian probability distributions (S205). The Gaussian mixture model is a probabilistic model that assumes all the data points are generated from a mixture of a finite number of Gaussian probability distributions with unknown parameters. The Gaussian Mixture Model may be learned from train data. Though not limited thereto, in the embodiment, Variational Bayesian Gaussian Mixture model, a variant of the Gaussian mixture model with variational inference algorithms, such as Variational Bayesian DPGMM (Dirichlet Process Gaussian Mixture Model) is used, which is an infinite mixture model with the Dirichlet Process, as a prior distribution on the number of clusters. Regarding Variational Bayesian DPGMM, reference may be made to NPL2 or NPL3. FIG. 13A shows a clustering result of the time repeated vector V using Variational Bayesian DPGMM. In FIG. 13A, a horizontal axis is a time axis and a vertical axis is a scaled version of probability density value.

Figure 13B:
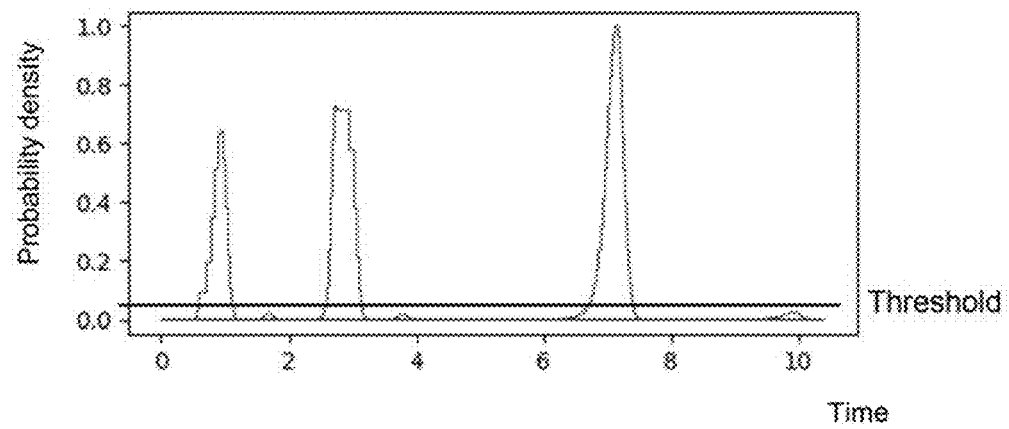

The vehicle estimation part 106 counts the number of clusters, each of which has a value of a probability density function greater than a predetermined threshold value (S206), as shown in FIG. 13B. The predetermined threshold value is defined to identify a response oscillation of the bridge induced by a vehicle passing on the lane of the bridge.

Figure 14:
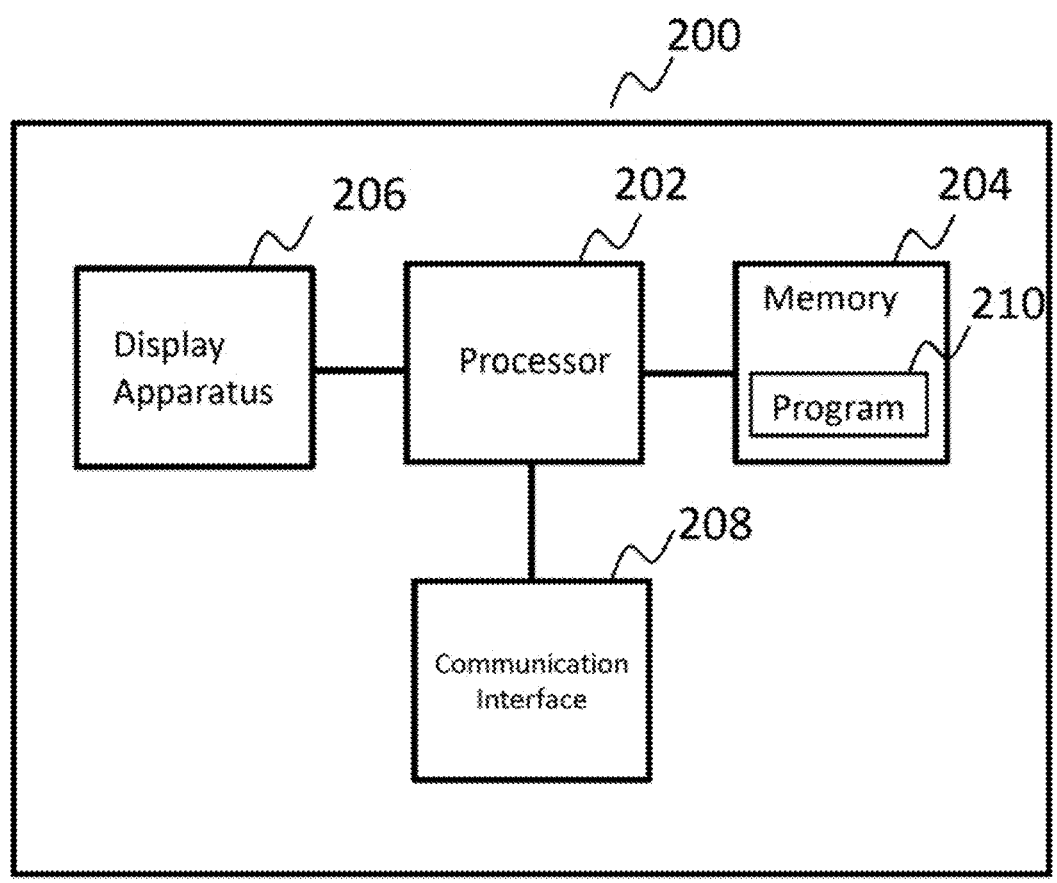
FIG. 14 is a diagram illustrating an arrangement of a vehicle detection system of the embodiment.

The vehicle detection apparatus 100 may be implemented on a computer system as illustrated in FIG. 14. Referring to FIG. 14, a computer apparatus 200, such as a server, includes a processor (Central Processing Unit) 202, a memory 204 including, for example, a semiconductor memory (for example, Random Access Memory (RAM), Read Only Memory (ROM), Electrically Erasable and Programmable ROM (EEPROM), and/or a storage device including at least one of Hard Disk Drive (HDD), SSD (Solid State Drive), Compact Disc (CD), Digital Versatile Disc (DVD) and so forth, a display apparatus 206 that display the result of detection of the number of a vehicle(s) passing on each lane, and a communication interface 208. The communication interface 208 (such as a network interface controller (NIC)) may well be configured to communicatively connect to sensor(s) provided under lanes of a bridge. A program 210 including program instructions (program modules) for executing processing of the signal acquisition part 102, the signal separation part 104, the vehicle estimation part 106 and the output part 108 of the vehicle detection apparatus 100 shown in FIG. 2 is(are) stored in a memory 204. The processor 202 is configured to read the program 210 (program instructions) from the memory 204 to execute the program (program instructions) to realize the function and processing of the vehicle detection apparatus 100.

In the above embodiments, detection of the number of vehicles passing on a single lane of a bridge is described, but the present invention is not limited to the number of vehicles. The present invention can be applied to detection of weight of a vehicle passing on a single lane of a bridge, a load weight of a vehicle, a deterioration/fatigue diagnostic of a bridge, etc.

In the above embodiments, accelerometers are used as sensors to detect impulse response (oscillation) of the bridge. However, in the present invention, a sensor is not limited to detection of impulse response (oscillation) of the bridge. That is, the present invention is applicable to an oscillation signal detected by an acoustic sensor such as a piezoelectric transducer, microphone, etc.

Figure 18A:
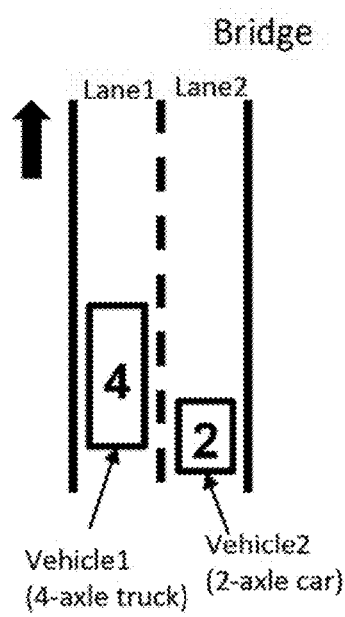
FIGS. 18A and 18B are a diagram and an example of an acceleration signal of parallel traffic model.
Figure 18B:
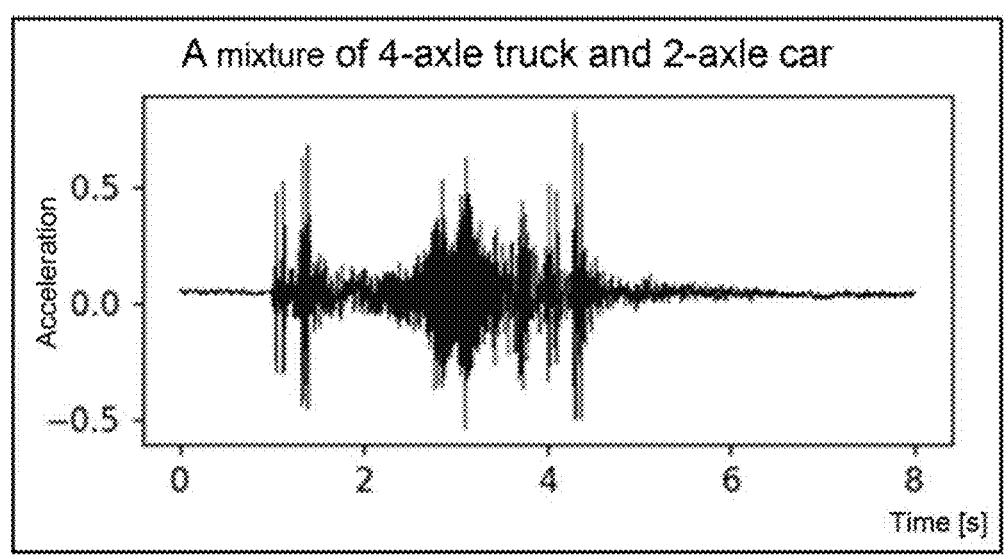
Figure 19A:
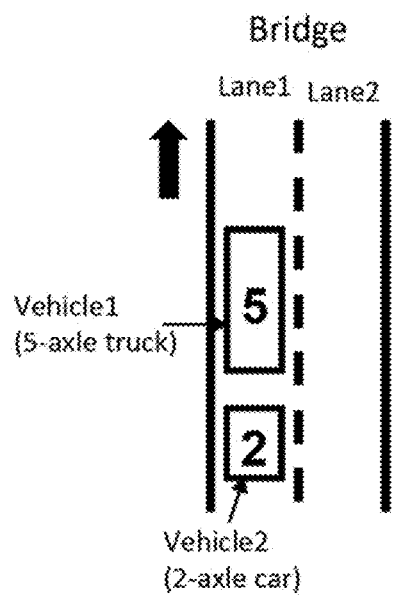
FIGS. 19A and 19B are a diagram and an example of an acceleration signal of serial traffic model.
Figure 19B:
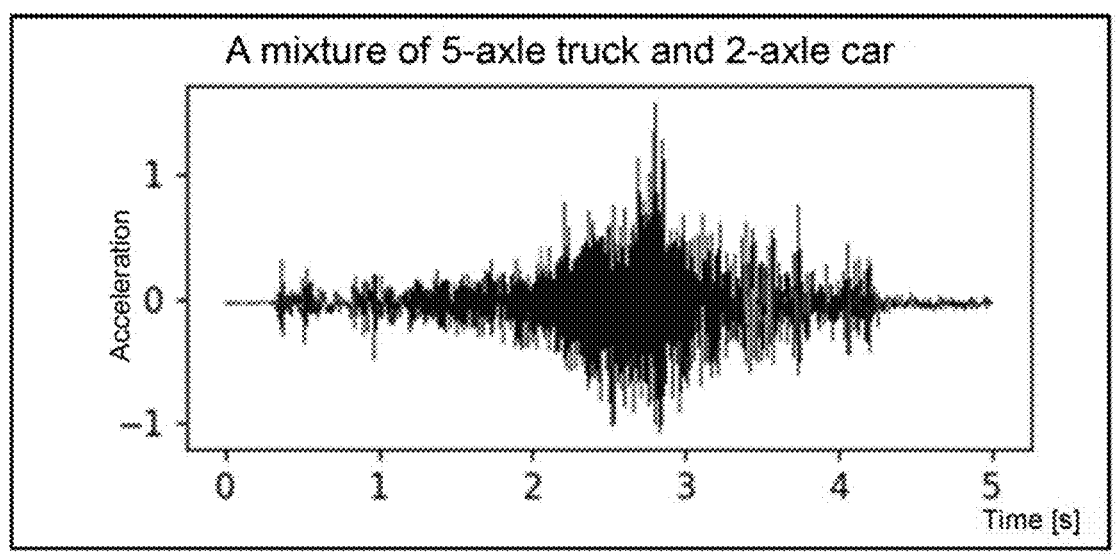
Figure 20A:
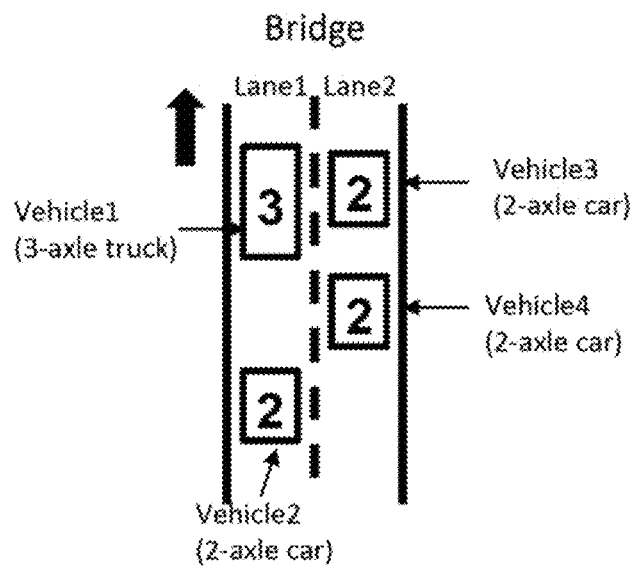
FIGS. 20A and 20B are a diagram and an example of an acceleration signal of mixture traffic model.
Figure 20B:
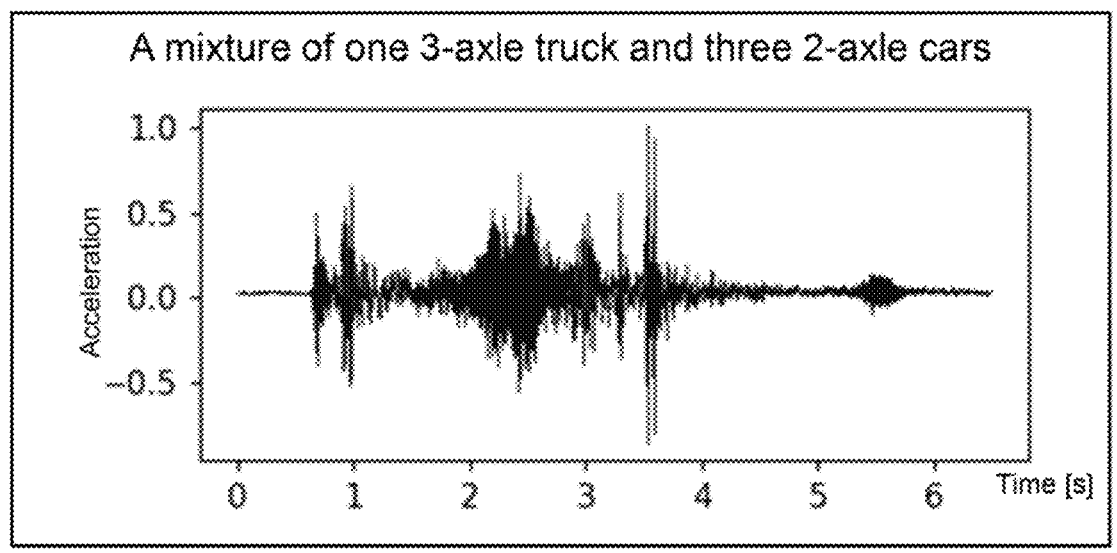

The following describes a further example embodiment. In this embodiment, the vehicle estimation part 106 is configured to realize vehicle detection in parallel traffic model (FIG. 18A). In this embodiment, without using BSS, the vehicle estimation part 106 can detect presence/absence of vehicle(s) passing on a lane(s) of the bridge 0. In this embodiment, the vehicle detection apparatus 100 includes the signal acquisition part 102, the vehicle estimation part 106, and the output part 108. The signal separation part 104 can be omitted.

Figure 15:
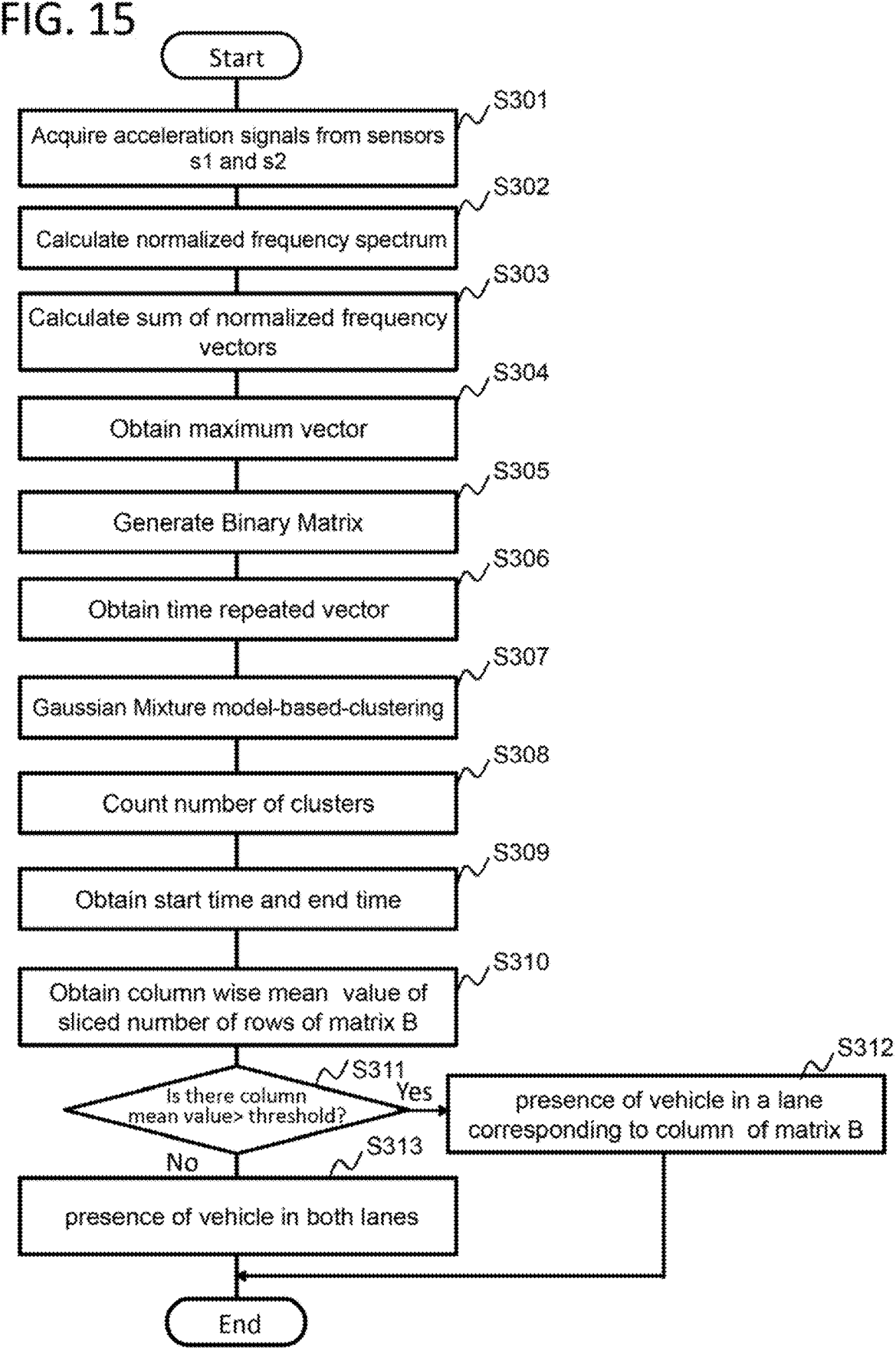
FIG. 15 is a diagram illustrating an operation example of the vehicle estimation part of another embodiment.
Figure 16A:
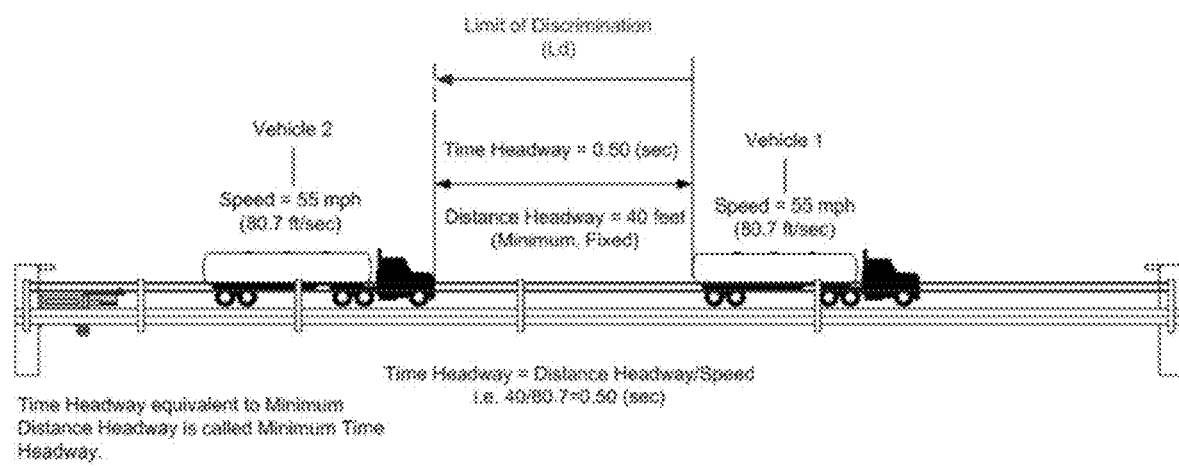
FIGS. 16A and 16B are figures cited from NPL1.
Figure 16B:
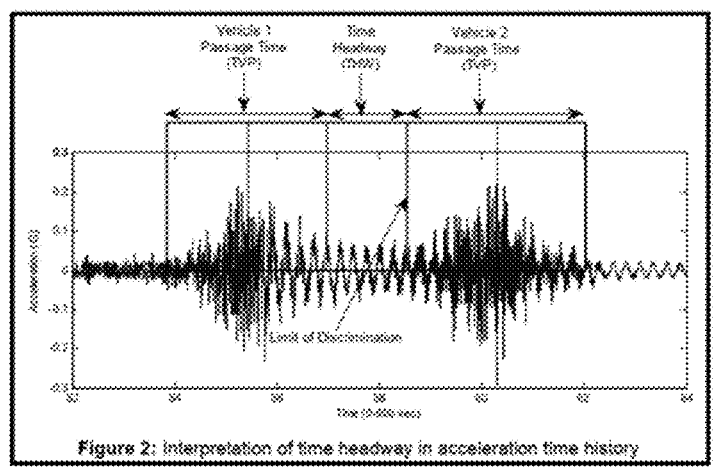
Figure 17:
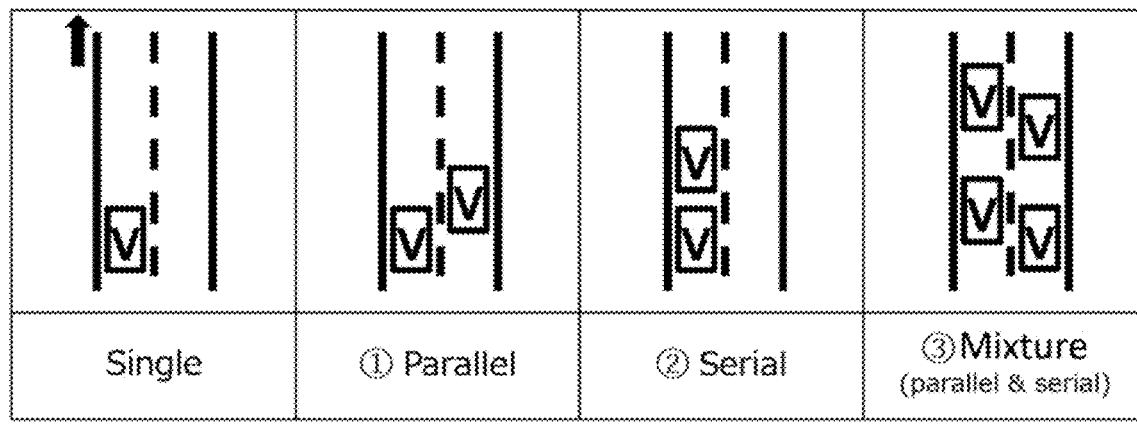
FIG. 17 is a schematic diagram of traffic models.

FIG. 15 is a flow chart illustrating an operation example of the vehicle estimation part 106 in this embodiment. The signal acquisition part 102 acquires oscillation signals (time domain signals) from sensors s1 and s2 (S301).

The vehicle estimation part 106 calculates a sum of a normalized frequency spectrum (S302). More specifically, the vehicle estimation part 106 extracts waveform data (frame) using a sliding window of a time interval T (length of one frame) and perform FFT (fast Fourier transform) to the extracted waveform data to obtain a frequency spectrum, which is normalized by dividing each frequency component (amplitude) by a total sum value of frequency components (amplitudes) of the frequency spectrum.

The vehicle estimation part 106 obtains sum of normalized frequency vectors from sensors s1 and s2, by using respectively the equation (4) and (5) which define the sum of normalized frequency for each frame (S303). The sum of normalized frequency vector (s1) is constituted by a time series vector including, as elements thereof (where total N elements are assumed), the sums of normalized frequency (each given by the equation (4)) e.g., for frames 1, 2, . . . , N (or time instant 1 to N). The sum of normalized frequency vector from the sensor s2 is constituted by a time series vector including, as elements thereof (where total N elements are assumed), the sums of normalized frequency (each given by the equation (5)), e.g., for frames 1, 2, . . . , N (or time instant 1 to N).

Then, the vehicle estimation part 106 obtains s1s2_maximum vector by selecting a maximum amplitude value at each time-instant (each element) from the sum of normalized frequency vector (s1) and the sum of normalized frequency vector (s2). The s1s2_maximum vector has N elements (S304).

$$s1s2\_maximum\ vector=max(sum\ of\ normalized\ frequency\ vector(s1), sum\ of\ normalized\ frequency\ vector(s2)) \quad (14)$$

For instance, let's assume sum of normalized frequency vector (s1)=[sa1, sa2, . . . , saN] where sa1, sa2, . . . , saN are sums of normalized frequency vector (s1) at time-instant 1, 2, . . . N and sum of normalized frequency vector (s2)=[sb1, sb2, . . . , sbN] where sb1, sb2, . . . , sbN are sums of normalized frequency vector (s2) at time-instant 1, 2, . . . N and sa1sb2>sb1, sa2<sa2, . . . and saN<sbN, then $$s1s2\_maximum\ vector=[sa1, sb2, \ldots, sbN] \quad (15)$$

The vehicle estimation part 106 generates a new binary matrix B with the number of rows equal to the number of elements in s1s2_maximum vector (N elements) and the number of columns equal to 2 (corresponding to sums of normalized frequency vectors (s1) and (s2)), where, at each time-instant, i.e., in each row, a value 1 represents element position with the maximum value and 0 otherwise (S305). In the case of the equation (15), the N*2 binary matrix is given as $$B^T = \begin{bmatrix} 0 & 1 \ldots 1 \\ 1 & 0 \ldots 0 \end{bmatrix} \quad (16)$$

where a superscript T indicates a transpose of the matrix B.

The vehicle estimation part 106 creates a time-repetition vector by repeating a time value by a corresponding magnitude value of the s1s2_maximum vector (S306). Similarly, the vehicle estimation part 106 also repeats the rows in the matrix B by repeating each row corresponding to a magnitude value of the s1s2_maximum vector.

Then, the vehicle estimation part 106 applies Gaussian Mixture model-based clustering (S307) and counts the number of clusters (S308), as explained in steps 205 and 206 in FIG. 10 on the time-repeated vectors, that is, counts the number of estimated Gaussian distributions (the number of vehicles).

Assuming, for example, ±3σ value (where σ is a standard deviation) from a mean value of the Gaussian distribution, as start time and end time of a vehicle impulse, the vehicle estimation part 106 obtains start time and end time of each vehicle present in each lane (S309). In order to detect in which lane the vehicle is present, the vehicle estimation part 106 calculates a column-wise mean of sliced number of rows from the binary matrix B, that corresponds to the start and end time of each vehicle. Assuming $b_{ij}$ is a value (1 or 0) of i-th row and j-th column of the binary matrix B (where j=1 or 2) (S310).

the column wise mean value (for $jth$ column) =

$$\left(\frac{1}{end\_time - start\_time}\right) \sum_{i=start\_time}^{end\_time} b_{ij} \quad (17)$$

When the column-wise mean value of the sliced number of rows of the binary matrix B is greater than or equal to a pre-defined threshold (S311: "Yes" branch), the vehicle estimation part 106 estimates that the vehicle is detected in that a lane corresponding to the column of the matrix B for which the column-wise mean value is calculated (corresponding to the sensors s1 or s2) of the matrix B (S312). When the column-wise mean value in both the columns of the matrix B is less than the pre-defined threshold (S311: "No" branch), the vehicle estimation part 106 estimates that presence of a vehicle is detected in both of the lanes under which the sensors s1 and s2 are arranged (S313). It is noted that the above described embodiments are not limited to two lanes running in parallel on the bridge but can be applied to detection of vehicles passing on three or more lanes on the bridge.

Each disclosure of the above-listed PTLs 1-3 and NPLs 1-3 is incorporated herein by reference. Modification and adjustment of each example embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and the like) are possible within the scope of the claims of the present invention. That is, the present invention naturally includes various variations and modifications that could be made by those skilled in the art according to the overall disclosure including the claims and the technical concept.

What is claimed is:

1. A vehicle detection apparatus comprising:
   at least a processor; and
   a memory storing program instructions executable by the processor, wherein the processor is configured to execute the program instructions to implement:
   a signal acquisition part that acquires a plurality of oscillation signals from a plurality of sensors, respectively, each sensor provided for each lane of a bridge that includes a plurality of lanes running in parallel and capable of sensing oscillation induced by a vehicle passing on the lane;
   a signal separation part that receives, from the signal acquisition part, the plurality of the oscillation signals, applies blind source separation (BSS) to the plurality of the oscillation signals to estimate and separate a plurality of source oscillation signals, each source oscillation signal specific to each lane, and adjusts amplitude of an individual one of the plurality of the source oscillation signals to output a plurality of amplitude adjusted oscillation signals; and a vehicle estimation part that receives the amplitude adjusted oscillation signal corresponding to the lane of interest from the signal separation part, and estimates, from the amplitude adjusted oscillation signal, a response oscillation due to a vehicle passing on the lane of interest to detect and count individual vehicles passing on the lane of interest.

2. The vehicle detection apparatus according to claim 1, wherein the signal separation part calculates a frequency spectrum of each frame of the oscillation signal by applying Fourier transform to the each frame extracted from the oscillation signal by a sliding window, calculates a sum of a normalized frequency spectrum, from the frequency spectrum of the each frame, for each lane, detects a first peak in at least one of a plurality of the sums of normalized frequency spectrum, each of the sums corresponding to each lane, to find a first vehicle region that is a time interval during which a vehicle is travelling on a lane and there is no vehicle travelling on other lane(s), performs the BSS to the oscillation signals of a time interval including the first vehicle region to estimate and separate the source oscillation signals, calculates an amplitude ratio based on the oscillation signal measured by the sensor for each lane and a corresponding source oscillation signal specific to each lane estimated by the BSS, and adjusts an amplitude of the source oscillation signal specific to each lane, by amplifying the amplitude of the source oscillation signal with the amplitude ratio to output the amplitude adjusted oscillation signals.

3. The vehicle detection apparatus according to claim 1, wherein the vehicle estimation part obtains a feature value for each frame of the amplitude adjusted oscillation signal by applying Fourier transform to the each frame extracted by a window of a predetermined length, and calculating a feature value for the each frame in a frequency domain, performs Gaussian mixture model-clustering on a time series of the feature values for respective frames to estimate one or more clusters, each of which is modeled with a Gaussian probability distribution best fit to the time series, and detects and counts individual vehicles passing on the lane by counting a number of clusters, each of which has a probability density value greater than a predetermined threshold value for detection of a response oscillation due to a vehicle passing on the lane.

4. The vehicle detection apparatus according to claim 1, where the estimation part applies Fourier transform to each frame extracted by a window of a predetermined length to obtain a frequency spectrum of the each frame, calculates a normalized frequency spectrum of the each frame by normalizing the frequency spectrum of the each frame, calculates a frame-wise sum of an amplitude spectrum of the normalized frequency spectrum, for the each frame, performs scaling of the frame-wise sum to a pre-defined range, obtains a time repeated vector of the scaled frame-wise sum by multiplying a time value of each scaled frame-wise sum by a magnitude of the each frame-wise sum, performs a Gaussian mixture model-clustering on the time repeated vector, and detect and counts individual vehicles passing on the lane by counting a number of clusters, each of which has a probability density value greater than a predetermined threshold value for detection of a response oscillation due to a vehicle passing on the lane.

5. The vehicle detection apparatus according to claim 1, wherein the vehicle estimation part obtains a frequency spectrum of each frame of the oscillation signal by applying Fourier transform to the each frame extracted from the oscillation signal by a sliding window and calculates a sum of a normalized frequency vector, from the frequency spectrum of the each frame, for each lane, to generate a maximum vector with each element thereof being a max value of the sum of a normalized frequency vectors calculated for the plurality of lane, generates a binary vector with columns, number of which is equal to number of the sums of normalized frequency vectors and with rows, an element of which corresponds to a time index and has a value 1 at an element position with a maximum value and 0 otherwise, obtains time repeated vectors of the sum of the normalized frequency vectors and maximum vectors by multiplying a time value by a magnitude value of each of the vectors, performs Gaussian mixture model-clustering on the time repeated vector to count a number of clusters and finds start time and end time of presence of a vehicle in each lane, and calculates a column-wise mean value of elements corresponding to the start time and the end time, in a row of a binary matrix to decide that the vehicle is present in a lane corresponding to a column of the binary matrix for which the column-wise mean value is calculated if the column-wise mean value is not less than a predetermined threshold value, while if the column-wise mean value is less than the predetermined threshold value for all columns of the binary matrix, deciding that the vehicle is present in the plurality of lanes, wherein the vehicle estimation part is enabled to detect presence or absence of a vehicle passing on a lane of the bridge, without using BSS.

6. A computer-based vehicle detection method comprising:

acquiring a plurality of oscillation signals from a plurality of sensors, respectively, each sensor provided for each lane of a bridge that includes a plurality of lanes running in parallel and capable of sensing oscillation induced by a vehicle passing on the lane;

performing signal separation processing comprising:
applying blind source separation (BSS) to the plurality of the oscillation signals to estimate and separate a plurality of source oscillation signals, each source oscillation signal specific to each lane; and adjusting amplitude of an individual one of the plurality of the source oscillation signals to output a plurality of amplitude adjusted oscillation signals; and performing estimation processing comprising:
receiving the amplitude adjusted oscillation signal corresponding to the lane of interest output from the signal separation processing; and estimating, from the amplitude adjusted oscillation signal, a response oscillation due to a vehicle passing on the lane of interest to detect and count individual vehicles passing on the lane of interest.

7. The computer-based vehicle detection method according to claim 6, wherein the signal separation processing comprises:
calculating a frequency spectrum of each frame of the oscillation signal by applying Fourier transform to each frame extracted by a window of a predetermined length;
calculating a sum of a normalized frequency spectrum, from the frequency spectrum of each frame, for each lane,
detecting a first peak in at least one of a plurality of the sums of normalized frequency spectrum, each of the sums corresponding to each lane, to find a first vehicle region that is a time interval during which a vehicle is travelling on a lane and there is no vehicle travelling on other lane(s),
performing the BSS to the oscillation signals of a time interval including the first vehicle region to estimate and separate the source oscillation signals,
calculating an amplitude ratio based on the oscillation signal measured by the sensor for each lane and a corresponding source oscillation signal specific to each lane estimated by the BSS, and
adjusting an amplitude of the source oscillation signal specific to each lane, by amplifying the amplitude of the source oscillation signal with the amplitude ratio to output the amplitude adjusted oscillation signals.

8. The computer-based vehicle detection method according to claim 6, wherein the estimation processing comprises:
obtaining a feature value for each frame of the amplitude adjusted oscillation signal by applying Fourier transform to each frame extracted by a window of a predetermined length, and calculating a feature value for the each frame in a frequency domain,
performing Gaussian mixture model-clustering on a time series of the feature values for respective frames to estimate one or more clusters, each of which is modeled with a Gaussian probability distribution best fit to the time series, and
detecting and counting individual vehicles passing on the lane by counting a number of clusters, each of which has a probability density value greater than a predetermined threshold value for detection of a response oscillation due to a vehicle passing on the lane.

9. The computer-based vehicle detection method according to claim 6, wherein the estimation processing comprises:
applying Fourier transform to each frame extracted by a window of a predetermined length to obtain a frequency spectrum of the each frame,
calculating a normalized frequency spectrum of the each frame by normalizing the frequency spectrum of the each frame,
calculating a frame-wise sum of an amplitude spectrum of the normalized frequency spectrum, for the each frame,
performing scaling of the frame-wise sum to a pre-defined range, obtaining a time repeated vector of the scaled frame-wise sum by multiplying a time value of each scaled frame-wise sum by a magnitude of the each frame-wise sum,
performing a Gaussian mixture model-clustering on the time repeated vector, and
detecting and counting individual vehicles passing on the lane by counting a number of clusters, each of which has a probability density value greater than a predetermined threshold value for detection of a response oscillation due to a vehicle passing on the lane.

10. The computer-based vehicle detection method according to claim 6, wherein the estimation processing comprises:
obtaining a frequency spectrum of each frame of the oscillation signal by applying Fourier transform to the each frame extracted from the oscillation signal by a sliding window and calculating a sum of a normalized frequency vector, from the frequency spectrum of the each frame, for each lane, to generate a maximum vector with each element thereof being a maximum value of the sum of a normalized frequency vectors calculated for the plurality of lane;
generating a binary vector with columns, number of which is equal to number of the sums of normalized frequency vectors and with rows, an element of which corresponds to a time index and has a value 1 at an element position with a maximum value and 0 otherwise,
obtaining time repeated vectors of the sum of the normalized frequency vectors and maximum vectors by multiplying a time value by a magnitude value of each of the vectors,
performing Gaussian mixture model-clustering on the time repeated vector to count a number of clusters to find start time and end time of presence of a vehicle in each lane;
calculating a column-wise mean value of elements corresponding to the start time and the end time, in a row of a binary matrix to decide that the vehicle is present in a lane corresponding to a column of the binary matrix for which the column-wise mean value is calculated if the column-wise mean value is not less than a predetermined threshold value,
while if the column-wise mean value is less than the predetermined threshold value for all columns of the binary matrix, deciding that the vehicle is present in the plurality of lanes, wherein the estimation processing is enabled to detect presence or absence of a vehicle passing on a lane of the bridge, without using BSS.

11. A non-transitory computer readable medium storing thereon a program causing a computer to execute processing comprising:
acquiring a plurality of oscillation signals from a plurality of sensors, respectively, each sensor provided for each lane of a bridge that includes a plurality of lanes running in parallel and capable of sensing oscillation induced by a vehicle passing on the lane;
performing signal separation processing comprising:
applying blind source separation (BSS) to the plurality of the oscillation signals to estimate and separate a plurality of source oscillation signals, each source oscillation signal specific to each lane; and
adjusting amplitude of an individual one of the plurality of the source oscillation signals to output a plurality of amplitude adjusted oscillation signals; and
performing estimation processing comprising:
receiving the amplitude adjusted oscillation signal corresponding to the lane of interest output from the signal separation processing; and
estimating, from the amplitude adjusted oscillation signal, a response oscillation due to a vehicle passing on the lane of interest to detect and count individual vehicles passing on the lane of interest.

12. The non-transitory computer readable medium according to claim 11, wherein the signal separation processing comprises:
  calculating a frequency spectrum of each frame of the oscillation signal by applying Fourier transform to each frame extracted by a window of a predetermined length;
  calculating a sum of a normalized frequency spectrum, from the frequency spectrum of each frame, for each lane,
  detecting a first peak in at least one of a plurality of the sums of normalized frequency spectrum, each of the sums corresponding to each lane, to find a first vehicle region that is a time interval during which a vehicle is travelling on a lane and there is no vehicle travelling on other lane(s),
  performing the BSS to the oscillation signals of a time interval including the first vehicle region to estimate and separate the source oscillation signals,
  calculating an amplitude ratio based on the oscillation signal measured by the sensor for each lane and a corresponding source oscillation signal specific to each lane estimated by the BSS, and
  adjusting an amplitude of the source oscillation signal specific to each lane, by amplifying the amplitude of the source oscillation signal with the amplitude ratio to output the amplitude adjusted oscillation signals.

13. The non-transitory computer readable medium according to claim 11, wherein the estimation processing comprises:
  obtaining a feature value for each frame of the amplitude adjusted oscillation signal by applying Fourier transform to each frame extracted by a window of a predetermined length, and calculating a feature value for the each frame in a frequency domain,
  performing Gaussian mixture model-clustering on a time series of the feature values for respective frames to estimate one or more clusters, each of which is modeled with a Gaussian probability distribution best fit to the time series, and
  detecting and counting individual vehicles passing on the lane by counting a number of clusters, each of which has a probability density value greater than a predetermined threshold value for detection of a response oscillation due to a vehicle passing on the lane.

14. The non-transitory computer readable medium according to claim 11, wherein the estimation processing comprises:
  applying Fourier transform to each frame extracted by a window of a predetermined length to obtain a frequency spectrum of the each frame,
  calculating a normalized frequency spectrum of the each frame by normalizing the frequency spectrum of the each frame,
  calculating a frame-wise sum of an amplitude spectrum of the normalized frequency spectrum, for the each frame,
  performing scaling of the frame-wise sum to a pre-defined range,
  obtaining a time repeated vector of the scaled frame-wise sum by multiplying a time value of each scaled frame-wise sum by a magnitude of the each frame-wise sum,
  performing a Gaussian mixture model-clustering on the time repeated vector, and
  detecting and counting individual vehicles passing on the lane by counting a number of clusters, each of which has a probability density value greater than a predetermined threshold value for detection of a response oscillation due to a vehicle passing on the lane.

15. The non-transitory computer readable medium according to claim 11, wherein estimation processing comprises:
  obtaining a frequency spectrum of each frame of the oscillation signal by applying Fourier transform to the each frame extracted from the oscillation signal by a sliding window and calculating a sum of a normalized frequency vector, from the frequency spectrum of the each frame, for each lane, to generate a maximum vector with each element thereof being a maximum value of the sum of a normalized frequency vectors calculated for the plurality of lane;
  generating a binary vector with columns, number of which is equal to number of the sums of normalized frequency vectors and with rows, an element of which corresponds to a time index and has a value 1 at an element position with a maximum value and 0 otherwise,
  obtaining time repeated vectors of the sum of the normalized frequency vectors and maximum vectors by multiplying a time value by a magnitude value of each of the vectors,
  performing Gaussian mixture model-clustering on the time repeated vector to count a number of clusters to find start time and end time of presence of a vehicle in each lane;
  calculating a column-wise mean value of elements corresponding to the start time and the end time, in a row of a binary matrix to decide that the vehicle is present in a lane corresponding to a column of the binary matrix for which the column-wise mean value is calculated if the column-wise mean value is not less than a predetermined threshold value,
  while if the column-wise mean value is less than the predetermined threshold value for all columns of the binary matrix, deciding that the vehicle is present in the plurality of lanes, wherein the estimation processing is enabled to detect presence or absence of a vehicle passing on a lane of the bridge, without using BSS.

* * * * *